US008145865B1

(12) United States Patent
Longinov et al.

(10) Patent No.: US 8,145,865 B1
(45) Date of Patent: Mar. 27, 2012

(54) VIRTUAL ORDERED WRITES SPILLOVER MECHANISM

(75) Inventors: Vadim Longinov, Marlborough, MA (US); Benjamin W. Yoder, Framingham, MA (US); Mark J. Halstead, Holliston, MA (US)

(73) Assignee: EMC Corporation, Hopkinton, MA (US)

(*) Notice: Subject to any disclaimer, the term of this patent is extended or adjusted under 35 U.S.C. 154(b) by 424 days.

(21) Appl. No.: 11/529,864

(22) Filed: Sep. 29, 2006

(51) Int. Cl.
*G06F 13/10* (2006.01)
(52) U.S. Cl. ........................................ 711/165
(58) Field of Classification Search .................. None
See application file for complete search history.

(56) References Cited

U.S. PATENT DOCUMENTS

| | | | |
|---|---|---|---|
| 5,206,939 A | 4/1993 | Yanai et al. | |
| 5,537,568 A | 7/1996 | Yanai et al. | |
| 5,742,792 A | 4/1998 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 6,324,654 B1 * | 11/2001 | Wahl et al. | 714/6 |
| 6,567,888 B2 * | 5/2003 | Kedem | 711/113 |
| 6,594,742 B1 | 7/2003 | Ezra | |
| 6,898,685 B2 | 5/2005 | Meiri et al. | |
| 7,024,528 B2 | 4/2006 | LeCrone et al. | |
| 7,051,176 B2 | 5/2006 | Meiri et al. | |
| 7,054,883 B2 | 5/2006 | Meiri et al. | |
| 7,113,945 B1 | 9/2006 | Moreshet et al. | |
| 7,117,386 B2 | 10/2006 | LeCrone et al. | |
| 7,328,324 B2 * | 2/2008 | Wang et al. | 711/173 |
| 7,395,377 B2 * | 7/2008 | Gill et al. | 711/143 |
| 2004/0193802 A1 | 9/2004 | Meiri et al. | |
| 2005/0149666 A1 * | 7/2005 | Meiri et al. | 711/112 |
| 2005/0198454 A1 | 9/2005 | Yoder et al. | |

OTHER PUBLICATIONS

U.S. Appl. No. 11/524,866, Longinov.

* cited by examiner

*Primary Examiner* — Duc Doan
(74) *Attorney, Agent, or Firm* — Muirhead and Saturnelli, LLC

(57) ABSTRACT

Managing data transferred from a local storage device to a remote storage device includes maintaining the data in chunks in cache memory, where data writes to the local storage device begun during a particular time interval are associated with a chunk of data that is separate from other chunks of data and where data is transferred from the local storage device to the remote storage device by transferring a particular chunk after all data writes associated with the particular chunk have completed and after a previous chunk has been acknowledged as being received by the remote storage device and, in response to use of the cache memory exceeding a first threshold, storing data from a first chunk of the cache memory to a local disk. Data writes to the local storage device may be provided by a host coupled to the local storage device.

20 Claims, 26 Drawing Sheets

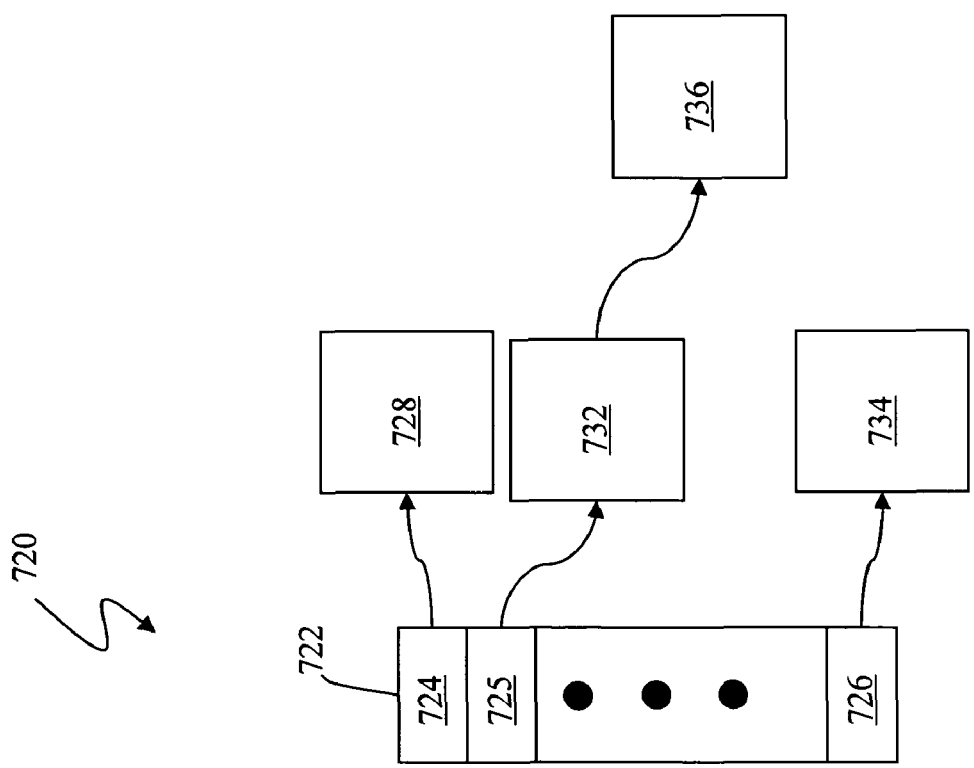

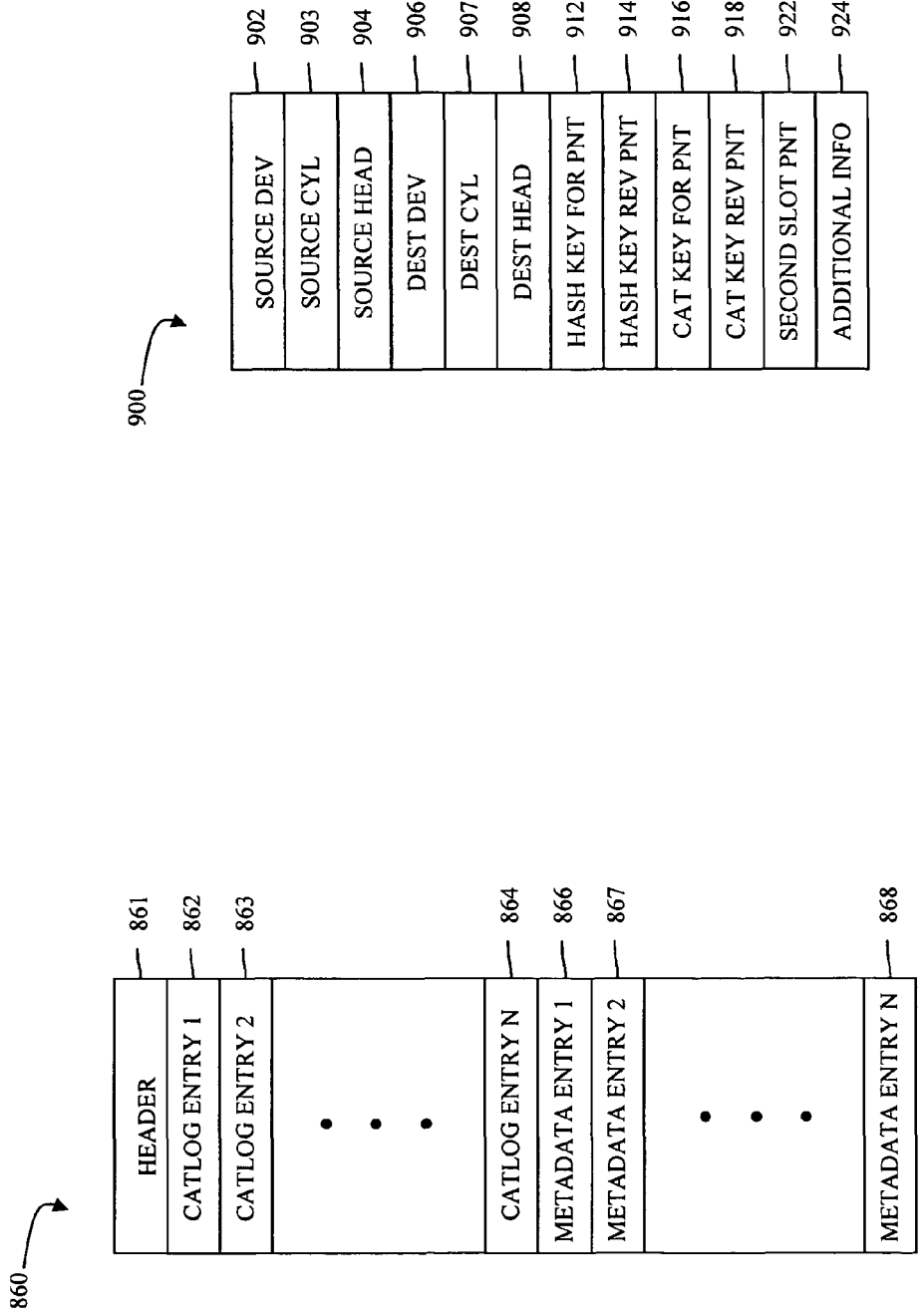

VIRTUAL ORDERED WRITES SPILLOVER MECHANISM

BACKGROUND OF THE INVENTION

1. Technical Field

This application relates to computer storage devices, and more particularly to the field of transferring data between storage devices.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

In some instances, it may be desirable to copy data from one storage device to another. For example, if a host writes data to a first storage device, it may be desirable to copy that data to a second storage device provided in a different location so that if a disaster occurs that renders the first storage device inoperable, the host (or another host) may resume operation using the data of the second storage device. Such a capability is provided, for example, by the Remote Data Facility (RDF) product provided by EMC Corporation of Hopkinton, Mass. With RDF, a first storage device, denoted the "primary storage device" (or "R1") is coupled to the host. One or more other storage devices, called "secondary storage devices" (or "R2") receive copies of the data that is written to the primary storage device by the host. The host interacts directly with the primary storage device, but any data changes made to the primary storage device are automatically provided to the one or more secondary storage devices using RDF. The primary and secondary storage devices may be connected by a data link, such as an ESCON link, a Fibre Channel link, and/or a Gigabit Ethernet link. The RDF functionality may be facilitated with an RDF adapter (RA) provided at each of the storage devices.

RDF allows synchronous data transfer where, after data written from a host to a primary storage device is transferred from the primary storage device to a secondary storage device using RDF, receipt is acknowledged by the secondary storage device to the primary storage device which then provides a write acknowledge back to the host. Thus, in synchronous mode, the host does not receive a write acknowledge from the primary storage device until the RDF transfer to the secondary storage device has been completed and acknowledged by the secondary storage device.

A drawback to the synchronous RDF system is that the latency of each of the write operations is increased by waiting for the acknowledgement of the RDF transfer. This problem is worse when there is a long distance between the primary storage device and the secondary storage device; because of transmission delays, the time delay required for making the RDF transfer and then waiting for an acknowledgement back after the transfer is complete may be unacceptable.

One possibility is to have the host write data to the primary storage device in asynchronous mode and have the primary storage device copy data to the secondary storage device in the background. The background copy involves cycling through each of the tracks of the primary storage device sequentially and, when it is determined that a particular block has been modified since the last time that block was copied, the block is transferred from the primary storage device to the secondary storage device. Although this mechanism may attenuate the latency problem associated with synchronous and semi-synchronous data transfer modes, a difficulty still exists because there can not be a guarantee of data consistency between the primary and secondary storage devices. If there are problems, such as a failure of the primary system, the secondary system may end up with out-of-order changes that make the data unusable.

A proposed solution to this problem is the Symmetrix Automated Replication (SAR) process, which is described in pending U.S. patent application Ser. No. 10/224,918 filed on Aug. 21, 2002 and U.S. Pat. No. 7,024,528. The SAR uses devices (BCV's) that can mirror standard logical devices. A BCV device can also be split from its standard logical device after being mirrored and can be resynced (i.e., reestablished as a mirror) to the standard logical devices after being split. However, using the SAR process requires the significant overhead of continuously splitting and resyncing the BCV's. The SAR process also uses host control and management, which relies on the controlling host being operational. In addition, the cycle time for a practical implementation of a SAR process is on the order of twenty to thirty minutes, and thus the amount of data that may be lost when an RDF link and/or primary device fails could be twenty to thirty minutes worth of data.

Thus, it would be desirable to have an RDF system that exhibits some of the beneficial qualities of each of the different techniques discussed above while reducing the drawbacks. Such a system would exhibit low latency for each host write regardless of the distance between the primary device and the secondary device and would provide consistency (recoverability) of the secondary device in case of failure. In addition, it would be useful in such a system did not adversely impact the use of the cache memory of the storage device.

SUMMARY OF THE INVENTION

According to the present invention, managing data transferred from a local storage device to a remote storage device includes maintaining the data in chunks in cache memory, where data writes to the local storage device begun during a particular time interval are associated with a chunk of data that is separate from other chunks of data and where data is transferred from the local storage device to the remote storage device by transferring a particular chunk after all data writes associated with the particular chunk have completed and after a previous chunk has been acknowledged as being received by the remote storage device and, in response to use of the cache memory exceeding a first threshold, storing data from a first chunk of the cache memory to a local disk. Data writes to the local storage device may be provided by a host coupled to the local storage device. Managing data transferred from a local storage device to a remote storage device may also include, following storing data from the first chunk of the cache memory to the local disk, storing data from a second chunk of the cache memory to the local disk in response to use of the cache memory exceeding a second threshold. The second chunk may be transmitted from the local storage device to the remote storage device while the first chunk is being stored on the local disk. In response to the local storage device not being able to transmit data to the remote storage device, the first chunk of data may be selected from a chunk of data ready to be transmitted from the local storage device to the remote storage device. Managing data transferred from a local storage device to a remote storage device may also include, in response to the cache memory having enough free space for all the chunks, restoring data from the local disk to the cache memory. Determining if the cache memory has enough free space for all the chunks may include summing an amount of chunk data in the cache memory with an amount of chunk data stored on the local disk and comparing a result thereof to the first threshold. Storing data from the first chunk of the cache memory to the local disk may also include providing information in a portion of the cache memory to facilitate restoring the data from the local disk to the cache memory.

According further to the present invention, computer software, provided in a computer readable storage medium, manages data transferred from a local storage device to a remote storage device. The software includes executable code that maintains the data in chunks in cache memory, where data writes to the local storage device begun during a particular time interval are associated with a chunk of data that is separate from other chunks of data and where data is transferred from the local storage device to the remote storage device by transferring a particular chunk after all data writes associated with the particular chunk have completed and after a previous chunk has been acknowledged as being received by the remote storage device and executable code that stores data from a first chunk of the cache memory to a local disk in response to use of the cache memory exceeding a first threshold. The software may also include executable code that, following storing data from the first chunk of the cache memory to the local disk, stores data from a second chunk of the cache memory to the local disk in response to use of the cache memory exceeding a second threshold. The second chunk may be transmitted from the local storage device to the remote storage device while the first chunk is being stored on the local disk. In response to the local storage device not being able to transmit data to the remote storage device, executable code may cause the first chunk of data to be selected from a chunk of data ready to be transmitted from the local storage device to the remote storage device. The computer software may also include executable code that restores data from the local disk to the cache memory in response to the cache memory having enough free space for all the chunks. Determining if the cache memory has enough free space for all the chunks may include summing an amount of chunk data in the cache memory with an amount of chunk data stored on the local disk and comparing a result thereof to the first threshold. The computer software may also include executable code that provides information in a portion of the cache memory to facilitate restoring the data from the local disk to the cache memory after storing data from the first chunk of the cache memory to the local disk.

According further to the present invention, a data storage device includes at least one disk drive that contains data, at least one host adaptor, coupled to the at least one disk drive, that receives data to be stored on the at least one disk drive, at least one cache memory that contains data writes to the data storage device begun during a particular time interval that are associated with a chunk of data that is separate from other chunks of data, where data is transferred by transferring a particular chunk after all data writes associated with the particular chunk have completed and after a previous chunk has been acknowledged as being received and computer software, in a computer-readable medium, having executable code that stores data from a first chunk of the cache memory to a local disk of the data storage device in response to use of the cache memory exceeding a first threshold. The computer software may also include executable code that, following storing data from the first chunk of the cache memory to the local disk, stores data from a second chunk of the cache memory to the local disk in response to use of the cache memory exceeding a second threshold. The computer software may also include executable code that restores data from the local disk to the cache memory in response to the cache memory having enough free space for all the chunks. Determining if the cache memory has enough free space for all the chunks may include summing an amount of chunk data in the cache memory with an amount of chunk data stored on the local disk and comparing a result thereof to the first threshold. The computer software may also include executable code that provides information in a portion of the cache memory to facilitate restoring the data from the local disk to the cache memory after storing data from the first chunk of the cache memory to the local disk.

According further to the present invention, managing a cache memory includes providing at least one spillover slot, stored in the cache memory, that contains information about a plurality of cache data slots transferred from the cache memory to a local disk, the spillover slot having a metadata portion with information about cache data slots transferred from the cache memory to the local disk and having a catalog portion with entries that point to different sections of the metadata portion, each section of the metadata portion corresponding to information about one of the cache data slots transferred from the cache memory to the local disk, for each of the cache data slots transferred from the cache memory to the local disk, determining a first hash key and a second hash key, linking information about each of the cache data slots transferred from the cache memory to the local disk to a hash chain of cache data slots that produce the same first hash key, and linking information about each of the cache data slots transferred from the cache memory to the local disk to a catalog entry chain of different information about one of the cache data slots transferred from the cache memory to the local disk within a single spillover slot, where each element in a catalog entry chain produces the same second hash key. Linking information about each of the cache data slots transferred from the cache memory to the local disk to a hash chain of cache data slots that produce the same first hash key may link cache data slots maintained in the cache memory with cache data slots transferred from the cache memory to the local disk. Linking information about a first cache data slot transferred from the cache memory to the local disk with information about a second cache data slot transferred from the cache memory to the local disk may include using an index value, different from a pointer to a cache slot, in instances where information about the first and second cache data slots is provided in a same spillover slot. The spillover slot may include a header that identifies the spillover slot and indicates which sections of information about the cache data slots transferred from the cache memory to the local disk are in use. Information about cache data slots transferred from the cache memory to the local disk may include forward and reverse pointers corresponding to the first hash key and forward and reverse pointers corresponding to the second hash key. Managing a cache memory may also include selecting at least one of a plurality of chunks of data to be transferred from the cache memory to the local disk, where each of the chunks correspond to data placed in the cache memory in response to data writes begun during a particular time interval. Managing a cache memory may also include, in response to the cache memory having sufficient free space, restoring data from the local disk to the cache memory using at least one of the spillover slots. Determining if the cache memory has sufficient free space may include summing an amount of data in the cache memory with an amount of data that had been previously transferred from the cache memory to the local disk.

According further to the present invention, computer software, provided in a computer-readable storage medium, manages a cache memory. The software includes executable code that provides at least one spillover slot, stored in the cache memory, that contains information about a plurality of cache data slots transferred from the cache memory to a local disk, the spillover slot having a metadata portion with information about cache data slots transferred from the cache memory to the local disk and having a catalog portion with entries that point to different sections of the metadata portion, each section of the metadata portion corresponding to information about one of the cache data slots transferred from the cache memory to the local disk, executable code that, for each of the cache data slots transferred from the cache memory to the local disk, determines a first hash key and a second hash key, executable code that links information about each of the cache data slots transferred from the cache memory to the local disk to a hash chain of cache data slots that produce the same first hash key, and executable code that links information about each of the cache data slots transferred from the cache memory to the local disk to a catalog entry chain of different information about one of the cache data slots transferred from the cache memory to the local disk within a single spillover slot, where each element in a catalog entry chain produces the same second hash key. Executable code that links information about each of the cache data slots transferred from the cache memory to the local disk to a hash chain of cache data slots that produce the same first hash key may link cache data slots maintained in the cache memory with cache data slots transferred from the cache memory to the local disk. Executable code that links information about a first cache data slot transferred from the cache memory to the local disk with information about a second cache data slot transferred from the cache memory to the local disk may use an index value, different from a pointer to a cache slot, in instances where information about the first and second cache data slots is provided in a same spillover slot. The spillover slot may include a header that identifies the spillover slot and indicates which sections of information about the cache data slots transferred from the cache memory to the local disk are in use. Information about cache data slots transferred from the cache memory to the local disk may include forward and reverse pointers corresponding to the first hash key and forward and reverse pointers corresponding to the second hash key. The computer software may also include executable code that selects at least one of a plurality of chunks of data to be transferred from the cache memory to the local disk, where each of the chunks correspond to data placed in the cache memory in response to data writes begun during a particular time interval. The computer software may also include executable code that restores data from the local disk to the cache memory using at least one of the spillover slots in response to the cache memory having sufficient free space. The computer software may also include executable code that determines if the cache memory has sufficient free space by summing an amount of data in the cache memory with an amount of data that had been previously transferred from the cache memory to the local disk.

According further to the present invention, a data storage device includes at least one disk drive that contains data, at least one host adaptor, coupled to the at least one disk drive, that receives data to be stored on the at least one disk drive, at least one cache memory that contains at least one spillover slot with information about a plurality of cache data slots transferred from the cache memory to a local disk, the spillover slot having a metadata portion with information about cache data slots transferred from the cache memory to the local disk and having a catalog portion with entries that point to different sections of the metadata portion, each section of the metadata portion corresponding to information about one of the cache data slots transferred from the cache memory to the local disk and computer software, in a computer-readable medium, having executable code that, for each of the cache data slots transferred from the cache memory to the local disk, determines a first hash key and a second hash key, executable code that links information about each of the cache data slots transferred from the cache memory to the local disk to a hash chain of cache data slots that produce the same first hash key, and executable code that links information about each of the cache data slots transferred from the cache memory to the local disk to a catalog entry chain of different information about one of the cache data slots transferred from the cache memory to the local disk within a single spillover slot, where each element in a catalog entry chain produces the same second hash key. Executable code that links information about each of the cache data slots transferred from the cache memory to the local disk to a hash chain of cache data slots that produce the same first hash key may link cache data slots maintained in the cache memory with cache data slots transferred from the cache memory to the local disk. Executable code that links information about a first cache data slot transferred from the cache memory to the local disk with information about a second cache data slot transferred from the cache memory to the local disk may use an index value, different from a pointer to a cache slot, in instances where information about the first and second cache data slots is provided in a same spillover slot. Information about cache data slots transferred from the cache memory to the local disk may include forward and reverse pointers corresponding to the first hash key and forward and reverse pointers corresponding to the second hash key.

BRIEF DESCRIPTION OF DRAWINGS

FIG. 17 is a diagram showing another embodiment of a table used to map logical device locations to slots containing data received by a remote storage device according to the system described herein.

FIG. 20 is a diagram showing a data structure for a spillover slot according to the system described herein.

FIG. 21 is a diagram showing a data structure for a metadata entry for a spillover slot according to the system described herein.

DETAILED DESCRIPTION OF VARIOUS EMBODIMENTS

Figure 1:
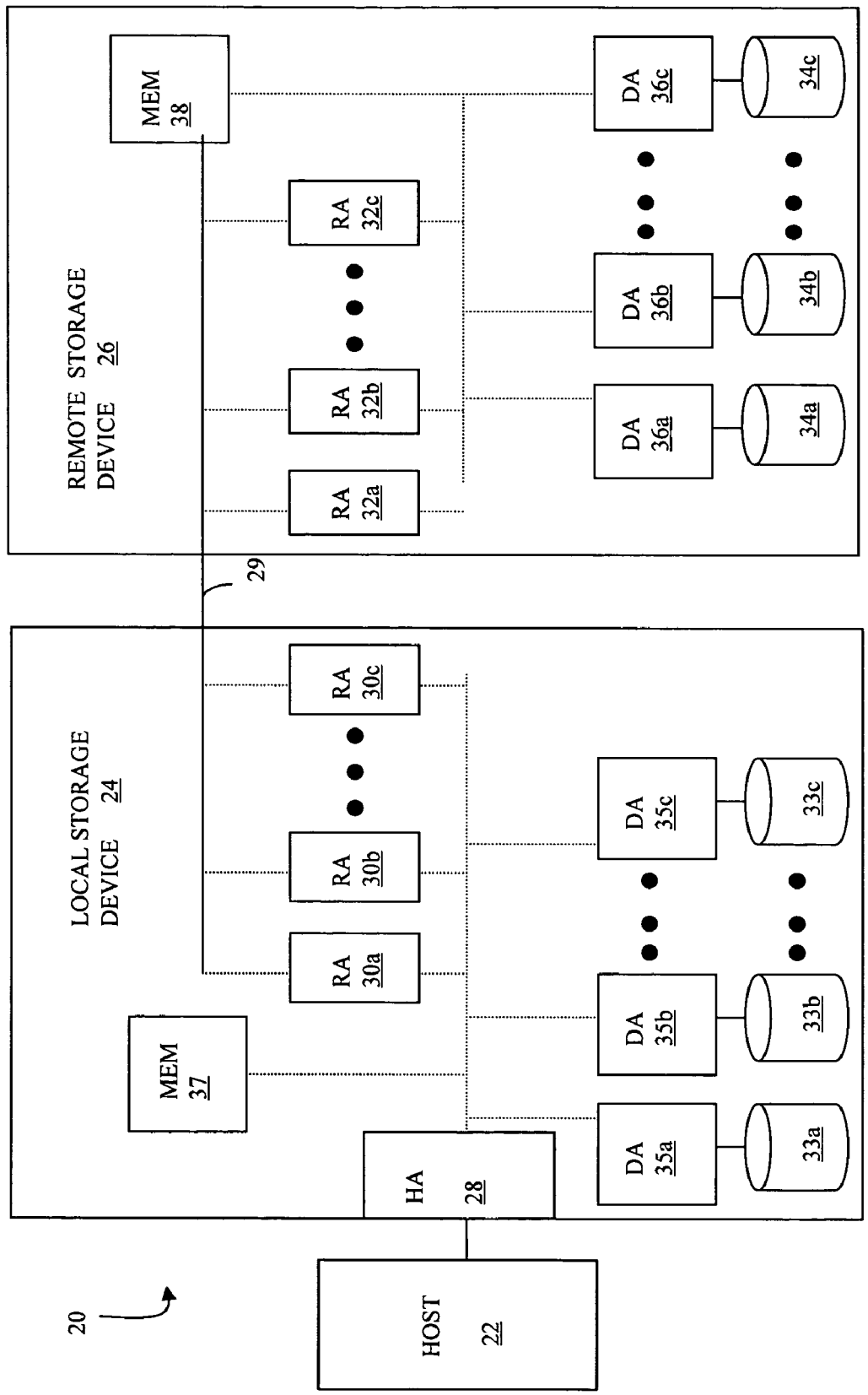
FIG. 1 is a schematic diagram showing a host, a local storage device, and a remote data storage device used in connection with the system described herein.

Referring to FIG. 1, a diagram 20 shows a relationship between a host 22, a local storage device 24 and a remote storage device 26. The host 22 reads and writes data from and to the local storage device 24 via a host adapter (HA) 28, which facilitates the interface between the host 22 and the local storage device 24. Although the diagram 20 only shows one host 22 and one HA 28, it will be appreciated by one of ordinary skill in the art that multiple HA's may be used and that one or more HA's may have one or more hosts coupled thereto.

Data from the local storage device 24 is copied to the remote storage device 26 via an RDF link 29 to cause the data on the remote storage device 26 to be identical to the data on the local storage device 24. Although only the one link 29 is shown, it is possible to have additional links between the storage devices 24, 26 and to have links between one or both of the storage devices 24, 26 and other storage devices (not shown). Note that there may be a time delay between the transfer of data from the local storage device 24 to the remote storage device 26, so that the remote storage device 26 may, at certain points in time, contain data that is not identical to the data on the local storage device 24. Communication using RDF is described, for example, in U.S. Pat. No. 5,742,792, which is incorporated by reference herein.

The local storage device 24 includes a first plurality of RDF adapter units (RA's) 30a, 30b, 30c and the remote storage device 26 includes a second plurality of RA's 32a-32c. The RA's 30a-30c, 32a-32c are coupled to the RDF link 29 and are similar to the host adapter 28, but are used to transfer data between the storage devices 24, 26. The software used in connection with the RA's 30a-30c, 32a-32c is discussed in more detail hereinafter.

The storage devices 24, 26 may include one or more disks, each containing a different portion of data stored on each of the storage devices 24, 26. FIG. 1 shows the storage device 24 including a plurality of disks 33a, 33b, 33c and the storage device 26 including a plurality of disks 34a, 34b, 34c. The RDF functionality described herein may be applied so that the data for at least a portion of the disks 33a-33c of the local storage device 24 is copied, using RDF, to at least a portion of the disks 34a-34c of the remote storage device 26. It is possible that other data of the storage devices 24, 26 is not copied between the storage devices 24, 26, and thus is not identical.

Each of the disks 33a-33c is coupled to a corresponding disk adapter unit (DA) 35a, 35b, 35c that provides data to a corresponding one of the disks 33a-33c and receives data from a corresponding one of the disks 33a-33c. Similarly, a plurality of DA's 36a, 36b, 36c of the remote storage device 26 are used to provide data to corresponding ones of the disks 34a-34c and receive data from corresponding ones of the disks 34a-34c. An internal data path exists between the DA's 35a-35c, the HA 28 and the RA's 30a-30c of the local storage device 24. Similarly, an internal data path exists between the DA's 36a-36c and the RA's 32a-32c of the remote storage device 26. Note that, in other embodiments, it is possible for more than one disk to be serviced by a DA and that it is possible for more than one DA to service a disk.

The local storage device 24 also includes a global memory 37 that may be used to facilitate data transferred between the DA's 35a-35c, the HA 28 and the RA's 30a-30c. The memory 37 may contain tasks that are to be performed by one or more of the DA's 35a-35c, the HA 28 and the RA's 30a-30c, and a cache for data fetched from one or more of the disks 33a-33c. Similarly, the remote storage device 26 includes a global memory 38 that may contain tasks that are to be performed by one or more of the DA's 36a-36c and the RA's 32a-32c, and a cache for data fetched from one or more of the disks 34a-34c. Use of the memories 37, 38 is described in more detail hereinafter.

The storage space in the local storage device 24 that corresponds to the disks 33a-33c may be subdivided into a plurality of volumes or logical devices. The logical devices may or may not correspond to the physical storage space of the disks 33a-33c. Thus, for example, the disk 33a may contain a plurality of logical devices or, alternatively, a single logical device could span both of the disks 33a, 33b. Similarly, the storage space for the remote storage device 26 that comprises the disks 34a-34c may be subdivided into a plurality of volumes or logical devices, where each of the logical devices may or may not correspond to one or more of the disks 34a-34c.

Providing an RDF mapping between portions of the local storage device 24 and the remote storage device 26 involves setting up a logical device on the remote storage device 26 that is a remote mirror for a logical device on the local storage device 24. The host 22 reads and writes data from and to the logical device on the local storage device 24 and the RDF mapping causes modified data to be transferred from the local storage device 24 to the remote storage device 26 using the RA's, 30a-30c, 32a-32c and the RDF link 29. In steady state operation, the logical device on the remote storage device 26 contains data that is identical to the data of the logical device on the local storage device 24. The logical device on the local storage device 24 that is accessed by the host 22 is referred to as the "R1 volume" (or just "R1") while the logical device on the remote storage device 26 that contains a copy of the data on the R1 volume is called the "R2 volume" (or just "R2"). Thus, the host reads and writes data from and to the R1 volume and RDF handles automatic copying and updating of the data from the R1 volume to the R2 volume.

Figure 2:
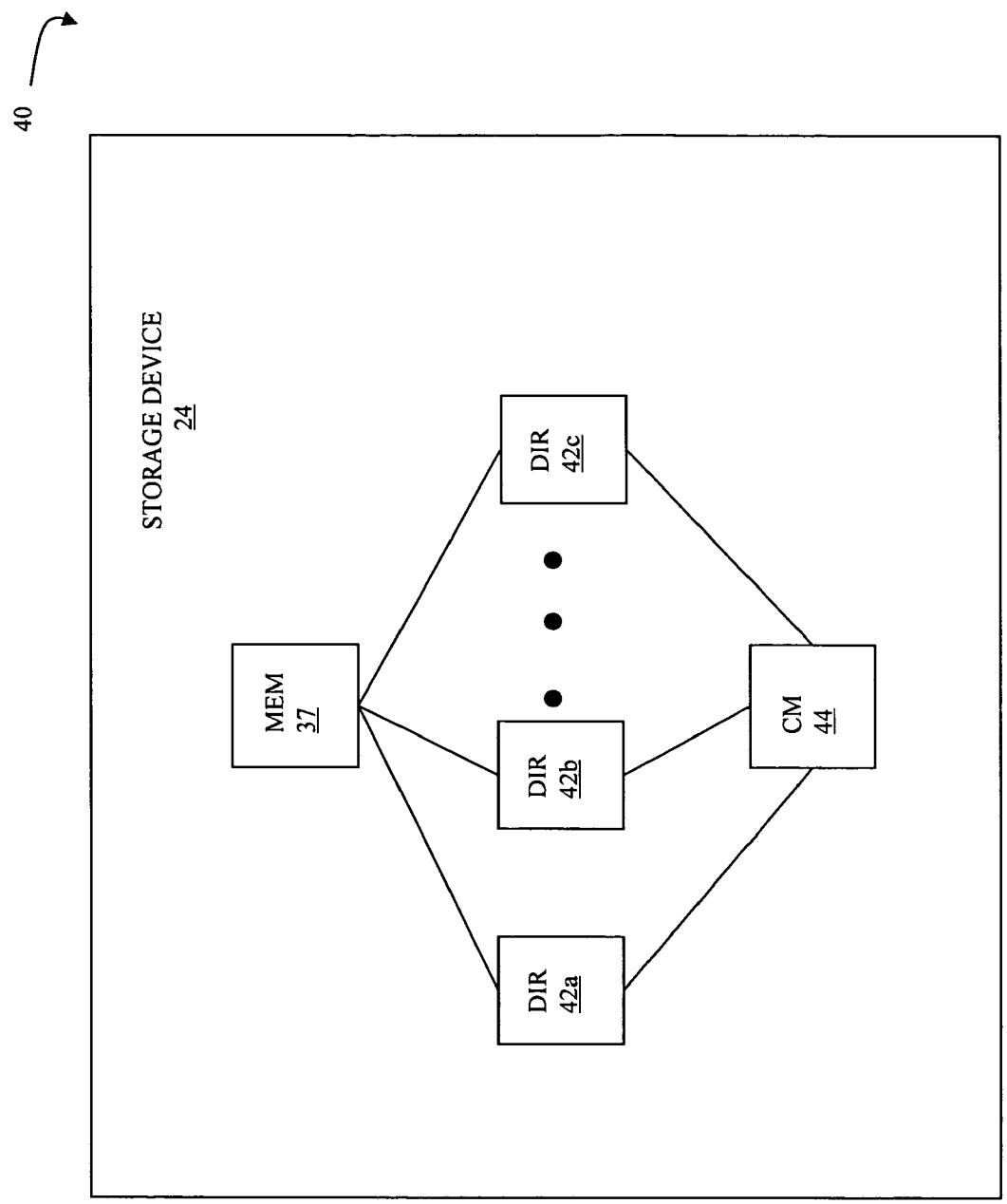
FIG. 2 is a diagram showing a storage device, memory, a plurality of directors, and a communication module according to the system described herein.

Referring to FIG. 2, a diagram 40 illustrates an embodiment of the storage device 24 where each of a plurality of directors 42a-42c are coupled to the memory 37. Each of the directors 42a-42c represents one of the RA's 32a-32c, the HA 28, and/or the DA's 38a-38c. In an embodiment disclosed herein, there may be up to sixtyfour directors coupled to the memory 37. Of course, for other embodiments, there may be a higher or lower maximum number of directors that may be used.

The diagram 40 also shows an optional communication module (CM) 44 that provides an alternative communication path between the directors 42a-42c. Each of the directors 42a-42c may be coupled to the CM 44 so that any one of the directors 42a-42c may send a message and/or data to any other one of the directors 42a-42c without needing to go through the memory 37. The CM 44 may be implemented using conventional MUX/router technology where a sending one of the directors 42a-42c provides an appropriate address to cause a message and/or data to be received by an intended receiving one of the directors 42a-42c. Some or all of the functionality of the CM 44 may be implemented using one or more of the directors 42a-42c so that, for example, the directors 42a-42c may be interconnected directly with the interconnection functionality being provided on each of the directors 42a-42c. In addition, a sending one of the directors 42a-42c may be able to broadcast a message to all of the other directors 42a-42c at the same time.

In some embodiments, one or more of the directors 42a-42c may have multiple processor systems thereon and thus may be able to perform functions for multiple directors. In some embodiments, at least one of the directors 42a-42c having multiple processor systems thereon may simultaneously perform the functions of at least two different types of directors (e.g., an HA and a DA). Furthermore, in some embodiments, at least one of the directors 42a-42c having multiple processor systems thereon may simultaneously perform the functions of at least one type of director and perform other processing with the other processing system.

Figure 3:
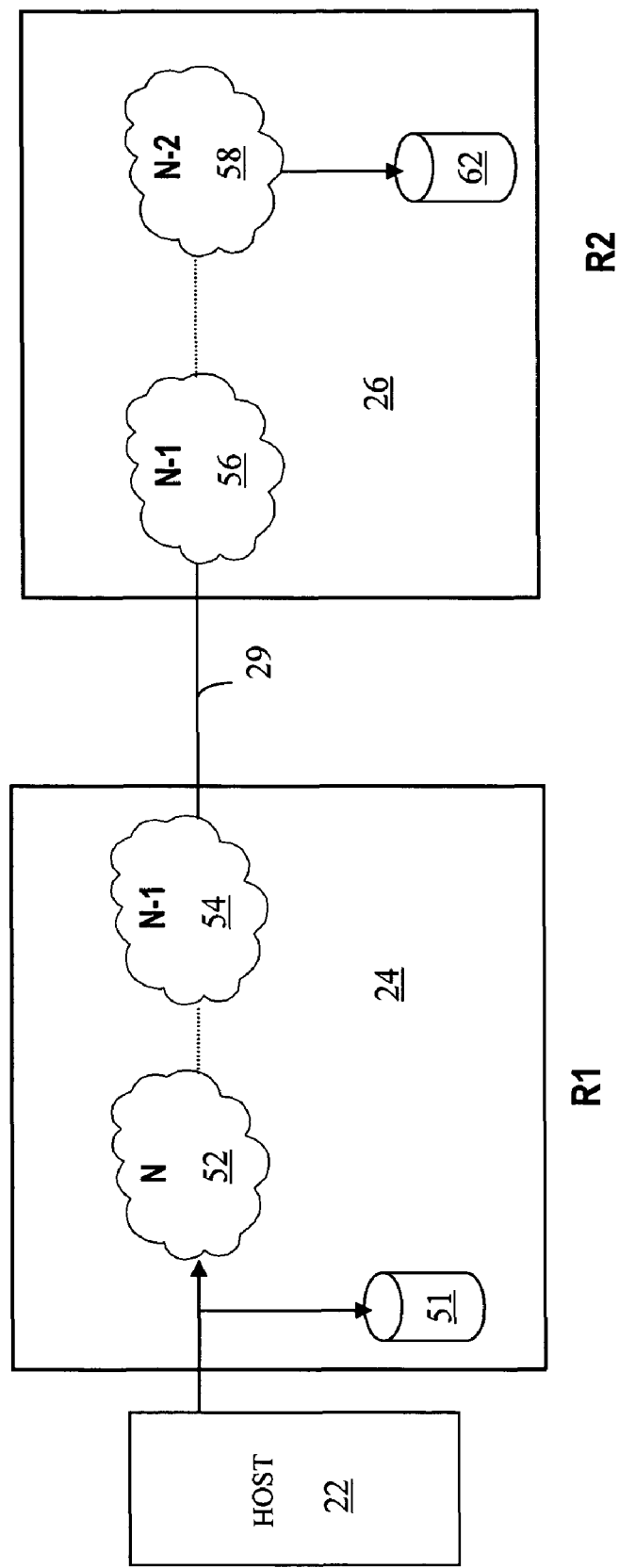
FIG. 3 is a schematic diagram showing a flow of data between a host, a local storage device, and a remote data storage device used in connection with the system described herein.

FIG. 3 illustrates a path of data from the host 22 to the local storage device 24 and the remote storage device 26. Data written from the host 22 to the local storage device 24 is stored locally, as illustrated by a data element 51 of the local storage device 24. The data that is written by the host 22 to the local storage device 24 is also maintained by the local storage device 24 in connection with being sent by the local storage device 24 to the remote storage device 26 via the link 29.

In the system described herein, each data write by the host 22 (of, for example a record, a plurality of records, a track, etc.) is assigned a sequence number. The sequence number may be provided in an appropriate data field associated with the write. In FIG. 3, the writes by the host 22 are shown as being assigned sequence number N. All of the writes performed by the host 22 that are assigned sequence number N are collected in a single chunk of data 52. The chunk 52 represents a plurality of separate writes by the host 22 that occur at approximately the same time.

Generally, the local storage device 24 accumulates chunks of one sequence number while transmitting a previously accumulated chunk (having the previous sequence number) to the remote storage device 26. Thus, while the local storage device 24 is accumulating writes from the host 22 that are assigned sequence number N, the writes that occurred for the previous sequence number (N−1) are transmitted by the local storage device 24 to the remote storage device 26 via the link 29. A chunk 54 represents writes from the host 22 that were assigned the sequence number N−1 that have not been transmitted yet to the remote storage device 26.

The remote storage device 26 receives the data from the chunk 54 corresponding to writes assigned a sequence number N−1 and constructs a new chunk 56 of host writes having sequence number N−1. The data may be transmitted using appropriate RDF protocol that acknowledges data sent across the link 29. When the remote storage device 26 has received all of the data from the chunk 54, the local storage device 24 sends a commit message to the remote storage device 26 to commit all the data assigned the N−1 sequence number corresponding to the chunk 56. Generally, once a chunk corresponding to a particular sequence number is committed, that chunk may be written to the logical storage device. This is illustrated in FIG. 3 with a chunk 58 corresponding to writes assigned sequence number N−2 (i.e., two before the current sequence number being used in connection with writes by the host 22 to the local storage device 26). In FIG. 3, the chunk 58 is shown as being written to a data element 62 representing disk storage for the remote storage device 26. Thus, the remote storage device 26 is receiving and accumulating the chunk 56 corresponding to sequence number N−1 while the chunk 58 corresponding to the previous sequence number (N−2) is being written to disk storage of the remote storage device 26 illustrated by the data element 62. In some embodiments, the data for the chunk 58 is marked for write (but not necessarily written immediately), while the data for the chunk 56 is not.

Thus, in operation, the host 22 writes data to the local storage device 24 that is stored locally in the data element 51 and is accumulated in the chunk 52. Once all of the data for a particular sequence number has been accumulated (described elsewhere herein), the local storage device 24 increments the sequence number. Data from the chunk 54 corresponding to one less than the current sequence number is transferred from the local storage device 24 to the remote storage device 26 via the link 29. The chunk 58 corresponds to data for a sequence number that was committed by the local storage device 24 sending a message to the remote storage device 26. Data from the chunk 58 is written to disk storage of the remote storage device 26.

Note that the writes within a particular one of the chunks 52, 54, 56, 58 are not necessarily ordered. However, as described in more detail elsewhere herein, every write for the chunk 58 corresponding to sequence number N−2 was begun prior to beginning any of the writes for the chunks 54, 56 corresponding to sequence number N−1. In addition, every write for the chunks 54, 56 corresponding to sequence number N−1 was begun prior to beginning any of the writes for the chunk 52 corresponding to sequence number N. Thus, in the event of a communication failure between the local storage device 24 and the remote storage device 26, the remote storage device 26 may simply finish writing the last committed chunk of data (the chunk 58 in the example of FIG. 3) and can be assured that the state of the data at the remote storage device 26 is ordered in the sense that the data element 62 contains all of the writes that were begun prior to a certain point in time and contains no writes that were begun after that point in time. Thus, R2 always contains a point in time copy of R1 and it is possible to reestablish a consistent image from the R2 device.

Figure 4:
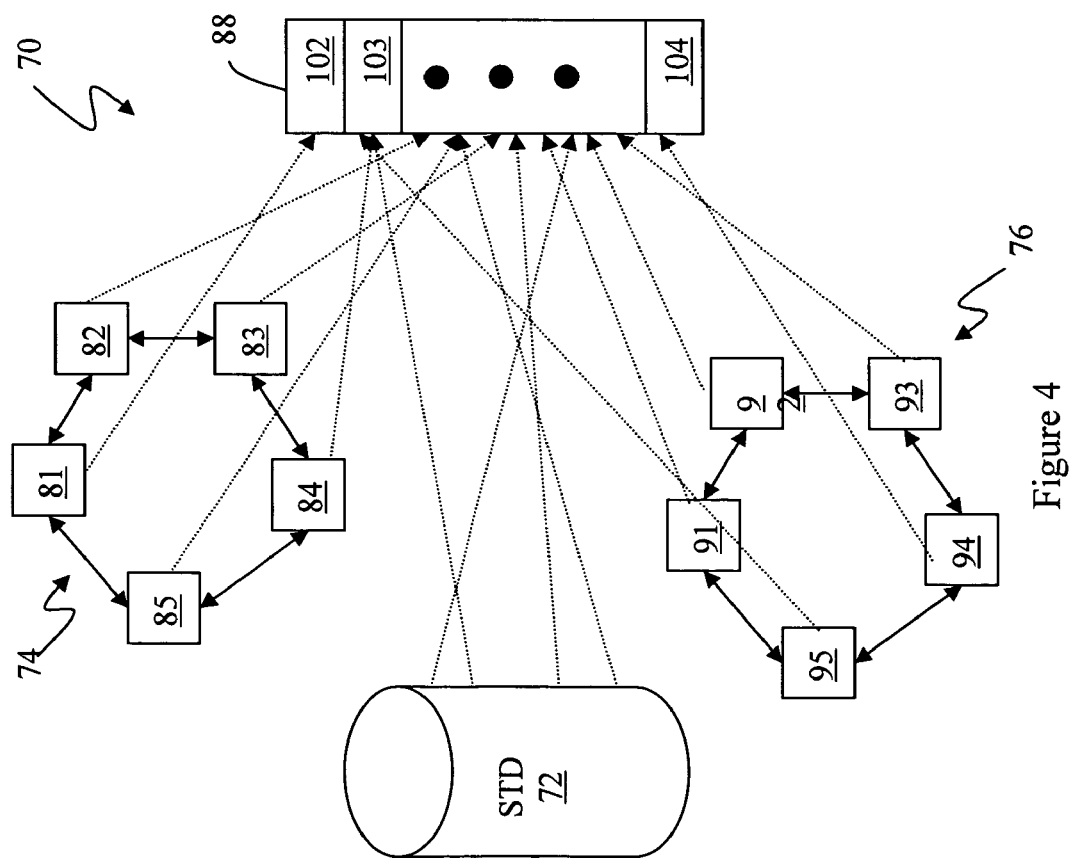
FIG. 4 is a schematic diagram illustrating items for constructing and manipulating chunks of data on a local storage device according to the system described herein.

Referring to FIG. 4, a diagram 70 illustrates items used to construct and maintain the chunks 52, 54. A standard logical device 72 contains data written by the host 22 and corresponds to the data element 51 of FIG. 3 and the disks 33a-33c of FIG. 1. The standard logical device 72 contains data written by the host 22 to the local storage device 24.

Two linked lists of pointers 74, 76 are used in connection with the standard logical device 72. The linked lists 74, 76 correspond to data that may be stored, for example, in the memory 37 of the local storage device 24. The linked list 74 contains a plurality of pointers 81-85, each of which points to a slot of a cache 88 used in connection with the local storage device 24. Similarly, the linked list 76 contains a plurality of pointers 91-95, each of which points to a slot of the cache 88. In some embodiments, the cache 88 may be provided in the memory 37 of the local storage device 24. The cache 88 contains a plurality of cache slots 102-104 that may be used in connection to writes to the standard logical device 72 and, at the same time, used in connection with the linked lists 74, 76.

Each of the linked lists 74, 76 may be used for one of the chunks of data 52, 54 so that, for example, the linked list 74 may correspond to the chunk of data 52 for sequence number N while the linked list 76 may correspond to the chunk of data 54 for sequence number N−1. Thus, when data is written by the host 22 to the local storage device 24, the data is provided to the cache 88 and, in some cases (described elsewhere herein), an appropriate pointer of the linked list 74 is created. Note that the data will not be removed from the cache 88 until the data is destaged to the standard logical device 72 and the data is also no longer pointed to by one of the pointers 81-85 of the linked list 74, as described elsewhere herein.

In an embodiment herein, one of the linked lists 74, 76 is deemed "active" while the other is deemed "inactive". Thus, for example, when the sequence number N is even, the linked list 74 may be active while the linked list 76 is inactive. The active one of the linked lists 74, 76 handles writes from the host 22 while the inactive one of the linked lists 74, 76 corresponds to the data that is being transmitted from the local storage device 24 to the remote storage device 26.

While the data that is written by the host 22 is accumulated using the active one of the linked lists 74, 76 (for the sequence number N), the data corresponding to the inactive one of the linked lists 74, 76 (for previous sequence number N−1) is transmitted from the local storage device 24 to the remote storage device 26. The RA's 30a-30c use the linked lists 74, 76 to determine the data to transmit from the local storage device 24 to the remote storage device 26.

Once data corresponding to a particular one of the pointers in one of the linked lists 74, 76 has been transmitted to the remote storage device 26, the particular one of the pointers may be removed from the appropriate one of the linked lists 74, 76. In addition, the data may also be marked for removal from the cache 88 (i.e., the slot may be returned to a pool of slots for later, unrelated, use) provided that the data in the slot is not otherwise needed for another purpose (e.g., to be destaged to the standard logical device 72). A mechanism may be used to ensure that data is not removed from the cache 88 until all devices are no longer using the data. Such a mechanism is described, for example, in U.S. Pat. No. 5,537,568 and in U.S. Pat. No. 6,594,742, both of which are incorporated by reference herein.

Figure 5:
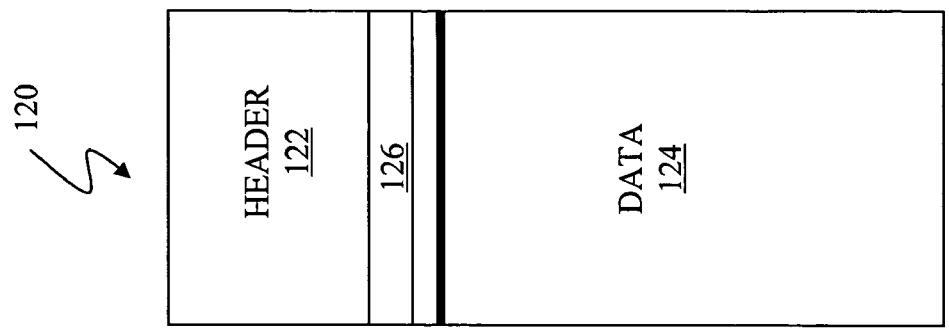
FIG. 5 is a diagram illustrating a data structure for a slot used in connection with the system described herein.

Referring to FIG. 5, a slot 120, like one of the slots 102-104 of the cache 88, includes a header 122 and data 124. The header 122 corresponds to overhead information used by the system to manage the slot 120. The data 124 is the corresponding data from the disk that is being (temporarily) stored in the slot 120. Information in the header 122 includes pointers back to the disk, time stamp(s), etc.

The header 122 also includes a cache stamp 126 used in connection with the system described herein. In an embodiment herein, the cache stamp 126 is eight bytes. Two of the bytes are a "password" that indicates whether the slot 120 is being used by the system described herein. In other embodiments, the password may be one byte while the following byte is used for a pad. As described elsewhere herein, the two bytes of the password (or one byte, as the case may be) being equal to a particular value indicates that the slot 120 is pointed to by at least one entry of the linked lists 74, 76. The password not being equal to the particular value indicates that the slot 120 is not pointed to by an entry of the linked lists 74, 76. Use of the password is described elsewhere herein.

The cache stamp 126 also includes a two byte field indicating the sequence number (e.g., N, N−1, N−2, etc.) of the data 124 of the slot 120. As described elsewhere herein, the sequence number field of the cache stamp 126 may be used to facilitate the processing described herein. The remaining four bytes of the cache stamp 126 may be used for a pointer, as described elsewhere herein, or, in some embodiments, may not be used at all. Of course, the two bytes of the sequence number and the four bytes of the pointer are only valid when the password equals the particular value that indicates that the slot 120 is pointed to by at least one entry in one of the lists 74, 76.

Figure 6:
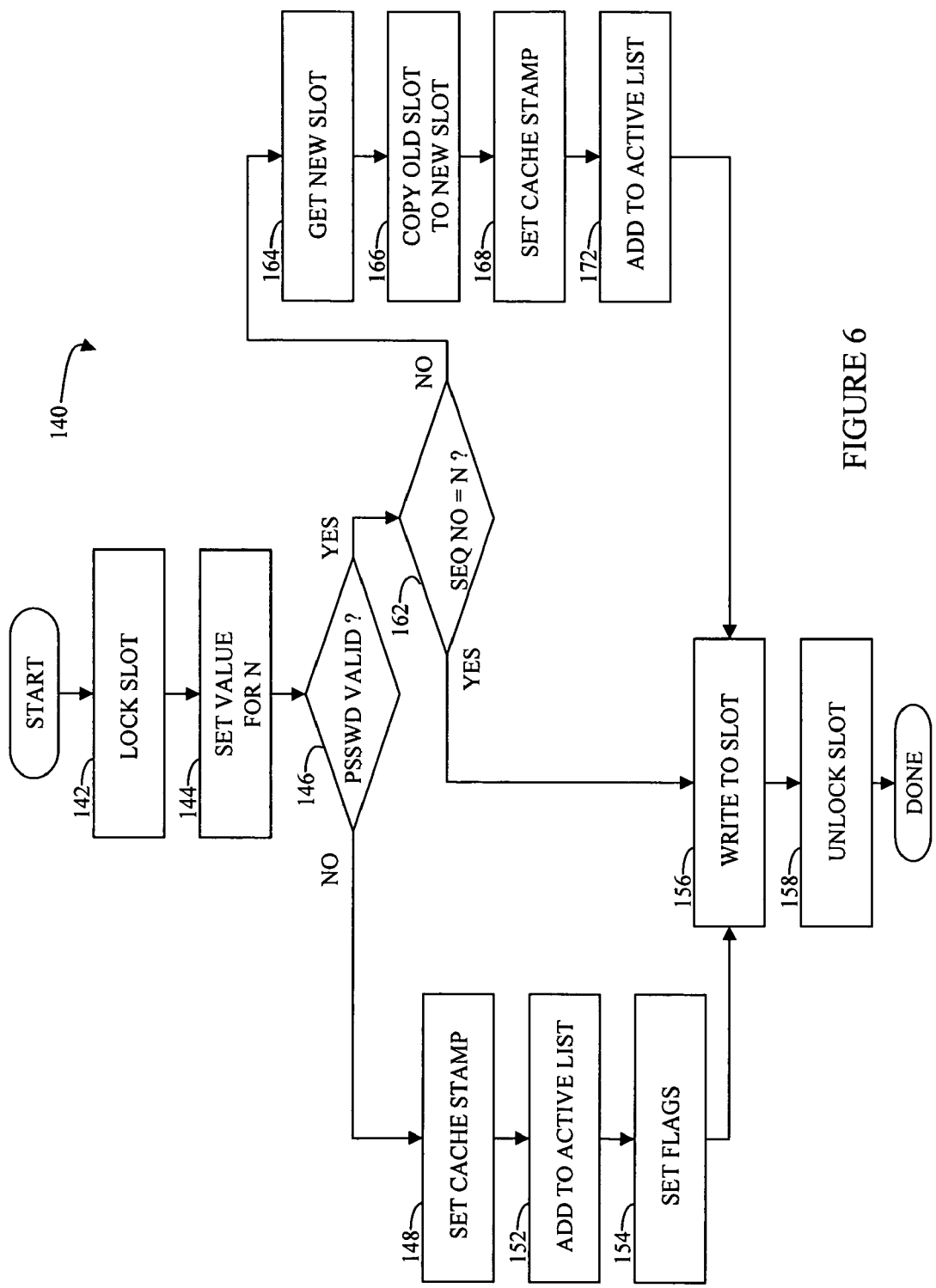
FIG. 6 is a flow chart illustrating operation of a host adaptor (HA) in response to a write by a host according to the system described herein.

Referring to FIG. 6, a flow chart 140 illustrates steps performed by the HA 28 in connection with a host 22 performing a write operation. Of course, when the host 22 performs a write, processing occurs for handling the write in a normal fashion irrespective of whether the data is part of an R1/R2 RDF group. For example, when the host 22 writes data for a portion of the disk, the write occurs to a cache slot which is eventually destaged to the disk. The cache slot may either be a new cache slot or may be an already existing cache slot created in connection with a previous read and/or write operation to the same track.

Processing begins at a first step 142 where a slot corresponding to the write is locked. In an embodiment herein, each of the slots 102-104 of the cache 88 corresponds to a track of data on the standard logical device 72. Locking the slot at the step 142 prevents additional processes from operating on the relevant slot during the processing performed by the HA 28 corresponding to the steps of the flow chart 140.

Following step 142 is a step 144 where a value for N, the sequence number, is set. As discussed elsewhere herein, the value for the sequence number obtained at the step 144 is maintained during the entire write operation performed by the HA 28 while the slot is locked. As discussed elsewhere herein, the sequence number is assigned to each write to set the one of the chunks of data 52, 54 to which the write belongs. Writes performed by the host 22 are assigned the current sequence number. It is useful that a single write operation maintain the same sequence number throughout.

Following the step 144 is a test step 146 which determines if the password field of the cache slot is valid. As discussed above, the system described herein sets the password field to a predetermined value to indicate that the cache slot is already in one of the linked lists of pointers 74, 76. If it is determined at the test step 146 that the password field is not valid (indicating that the slot is new and that no pointers from the lists 74, 76 point to the slot), then control passes from the step 146 to a step 148, where the cache stamp of the new slot is set by setting the password to the predetermined value, setting the sequence number field to N, and setting the pointer field to Null. In other embodiments, the pointer field may be set to point to the slot itself.

Following the step 148 is a step 152 where a pointer to the new slot is added to the active one of the pointer lists 74, 76. In an embodiment herein, the lists 74, 76 are circular doubly linked lists, and the new pointer is added to the circular doubly linked list in a conventional fashion. Of course, other appropriate data structures could be used to manage the lists 74, 76. Following the step 152 is a step 154 where flags are set. At the step 154, the RDF_WP flag (RDF write pending flag) is set to indicate that the slot needs to be transmitted to the remote storage device 26 using RDF. In addition, at the step 154, the LOCAL_WP flag is set to indicate that the slot needs to be destaged to the standard logical device 72. Following the step 154 is a step 156 where the data being written by the host 22 and the HA 28 is written to the slot. Following the step 156 is a step 158 where the slot is unlocked. Following step 158, processing is complete.

If it is determined at the test step 146 that the password field of the slot is valid (indicating that the slot is already pointed to by at least one pointer of the lists 74, 76), then control transfers from the step 146 to a test step 162, where it is determined whether the sequence number field of the slot is equal to the current sequence number, N. Note that there are two valid possibilities for the sequence number field of a slot with a valid password. It is possible for the sequence number field to be equal to N, the current sequence number. This occurs when the slot corresponds to a previous write with sequence number N. The other possibility is for the sequence number field to equal N−1. This occurs when the slot corresponds to a previous write with sequence number N−1. Any other value for the sequence number field is invalid. Thus, for some embodiments, it may be possible to include error/validity checking in the step 162 or possibly make error/validity checking a separate step. Such an error may be handled in any appropriate fashion, which may include providing a message to a user.

If it is determined at the step 162 that the value in the sequence number field of the slot equals the current sequence number N, then no special processing is required and control transfers from the step 162 to the step 156, discussed above, where the data is written to the slot. Otherwise, if the value of the sequence number field is N−1 (the only other valid value), then control transfers from the step 162 to a step 164 where a new slot is obtained. The new slot obtained at the step 164 may be used to store the data being written.

Following the step 164 is a step 166 where the data from the old slot is copied to the new slot that was obtained at the step 164 (a duplicate slot is created). Note that that the copied data includes the RDF_WP flag, which should have been set at the step 154 on a previous write when the slot was first created. Following the step 166 is a step 168 where the cache stamp for the new slot is set by setting the password field to the appropriate value, setting the sequence number field to the current sequence number, N, and setting the pointer field to point to the old slot. Following the step 168 is a step 172 where a pointer to the new slot is added to the active one of the linked lists 74, 76. Following the step 172 is the step 156, discussed above, where the data is written to the slot which, in this case, is the new slot. In some embodiments, an additional test may be performed so that the step 164, 166, 168, 172 are only executed when the original slot contains data that has not yet been destaged.

Figure 7:
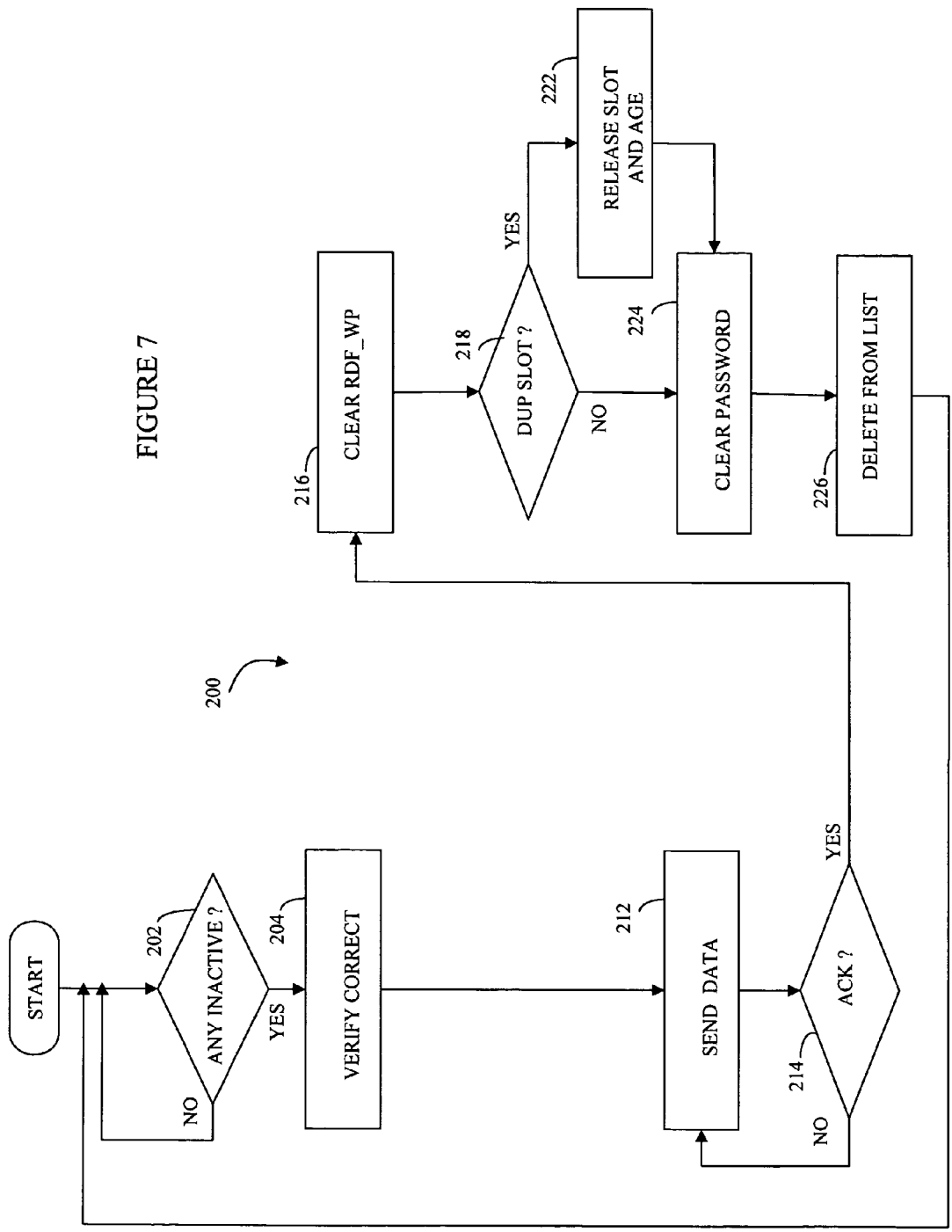
FIG. 7 is a flow chart illustrating transferring data from a local storage device to a data storage device according to the system described herein.

Referring to FIG. 7, a flow chart 200 illustrates steps performed in connection with the RA's 30a-30c scanning the inactive one of the lists 72, 74 to transmit RDF data from the local storage device 24 to the remote storage device 26. As discussed above, the inactive one of the lists 72, 74 points to slots corresponding to the N−1 cycle for the R1 device when the N cycle is being written to the R1 device by the host using the active one of the lists 72, 74.

Processing begins at a first step 202 where it is determined if there are any entries in the inactive one of the lists 72, 74. As data is transmitted, the corresponding entries are removed from the inactive one of the lists 72, 74. In addition, new writes are provided to the active one of the lists 72, 74 and not generally to the inactive one of the lists 72, 74. Thus, it is possible (and desirable, as described elsewhere herein) for the inactive one of the lists 72, 74 to contain no data at certain times. If it is determined at the step 202 that there is no data to be transmitted, then the inactive one of the lists 72, 74 is continuously polled until data becomes available. Data for sending becomes available in connection with a cycle switch (discussed elsewhere herein) where the inactive one of the lists 72, 74 becomes the active one of the lists 72, 74, and vice versa.

If it is determined at the step 202 that there is data available for sending, control transfers from the step 202 to a step 204, where the slot is verified as being correct. The processing performed at the step 204 is an optional "sanity check" that may include verifying that the password field is correct and verifying that the sequence number field is correct. If there is incorrect (unexpected) data in the slot, error processing may be performed, which may include notifying a user of the error and possibly error recovery processing.

Following the step 204 is a step 212, where the data is sent via RDF in a conventional fashion. In an embodiment herein, the entire slot is not transmitted. Rather, only records within the slot that have the appropriate mirror bits set (indicating the records have changed) are transmitted to the remote storage device 26. However, in other embodiments, it may be possible to transmit the entire slot, provided that the remote storage device 26 only writes data corresponding to records having appropriate mirror bits set and ignores other data for the track, which may or may not be valid. Following the step 212 is a test step 214 where it is determined if the data that was transmitted has been acknowledged by the R2 device. If not, the data is resent, as indicated by the flow from the step 214 back to the step 212. In other embodiments, different and more involved processing may be used to send data and acknowledge receipt thereof. Such processing may include error reporting and alternative processing that is performed after a certain number of attempts to send the data have failed.

Once it is determined at the test step 214 that the data has been successfully sent, control passes from the step 214 to a step 216 to clear the RDF_WP flag (since the data has been successfully sent via RDF). Following the step 216 is a test step 218 where it is determined if the slot is a duplicate slot created in connection with a write to a slot already having an existing entry in the inactive one of the lists 72, 74. This possibility is discussed above in connection with the steps 162, 164, 166, 168, 172. If it is determined at the step 218 that the slot is a duplicate slot, then control passes from the step 218 to a step 222 where the slot is returned to the pool of available slots (to be reused). In addition, the slot may also be aged (or have some other appropriate mechanism applied thereto) to provide for immediate reuse ahead of other slots since the data provided in the slot is not valid for any other purpose. Following the step 222 or the step 218 if the slot is not a duplicate slot is a step 224 where the password field of the slot header is cleared so that when the slot is reused, the test at the step 146 of FIG. 6 properly classifies the slot as a new slot.

Following the step 224 is a step 226 where the entry in the inactive one of the lists 72, 74 is removed. Following the step 226, control transfers back to the step 202, discussed above, where it is determined if there are additional entries on the inactive one of the lists 72, 74 corresponding to data needing to be transferred.

Figure 8:
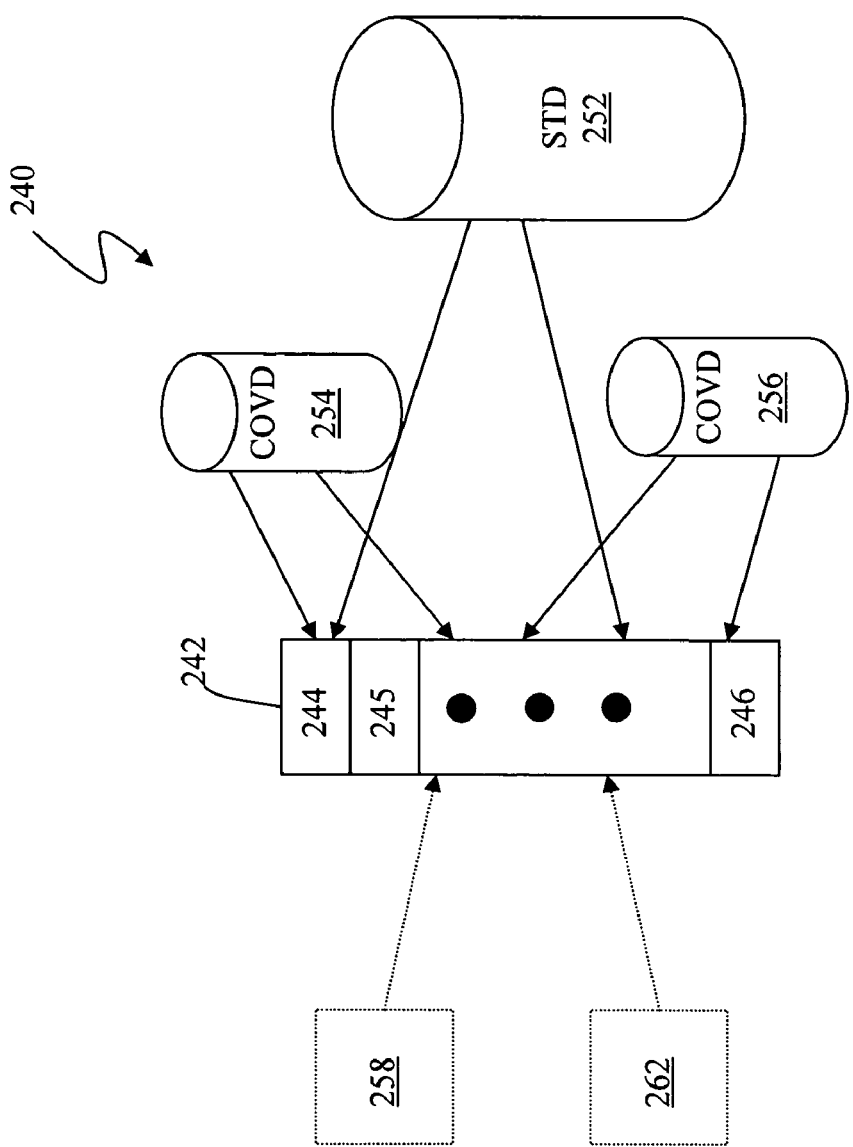
FIG. 8 is a schematic diagram illustrating items for constructing and manipulating chunks of data on a remote storage device according to the system described herein.

Referring to FIG. 8, a diagram 240 illustrates creation and manipulation of the chunks 56, 58 used by the remote storage device 26. Data that is received by the remote storage device 26, via the link 29, is provided to a cache 242 of the remote storage device 26. The cache 242 may be provided, for example, in the memory 38 of the remote storage device 26. The cache 242 includes a plurality of cache slots 244-246, each of which may be mapped to a track of a standard logical storage device 252. The cache 242 is similar to the cache 88 of FIG. 4 and may contain data that can be destaged to the standard logical storage device 252 of the remote storage device 26. The standard logical storage device 252 corresponds to the data element 62 shown in FIG. 3 and the disks 34a-34c shown in FIG. 1.

The remote storage device 26 also contains a pair of cache only virtual devices 254, 256 (COVD's). The cache only virtual devices 254, 256 corresponded device tables that may be stored, for example, in the memory 38 of the remote storage device 26. Each track entry of the tables of each of the cache only virtual devices 254, 256 point to either a track of the standard logical device 252 or point to a slot of the cache 242. Cache only virtual devices are described in U.S. Pat. No. 7,113,945, issued on Sep. 26, 2006, titled VIRTUAL STORAGE DEVICE THAT USES VOLATILE MEMORY, which is incorporated by reference herein.

The plurality of cache slots 244-246 may be used in connection to writes to the standard logical device 252 and, at the same time, used in connection with the cache only virtual devices 254, 256. In an embodiment herein, each of track table entry of the cache only virtual devices 254, 256 contain a null to indicate that the data for that track is stored on a corresponding track of the standard logical device 252. Otherwise, an entry in the track table for each of the cache only virtual devices 254, 256 contains a pointer to one of the slots 244-246 in the cache 242.

Each of the cache only virtual devices 254, 256 corresponds to one of the data chunks 56, 58. Thus, for example, the cache only virtual device 254 may correspond to the data chunk 56 while the cache only virtual device 256 may correspond to the data chunk 58. In an embodiment herein, one of the cache only virtual devices 254, 256 may be deemed "active" while the other one of the cache only virtual devices 254, 256 may be deemed "inactive". The inactive one of the cache only virtual devices 254, 256 may correspond to data being received from the local storage device 24 (i.e., the chunk 56) while the active one of the cache only virtual device 254, 256 corresponds to data being restored (written) to the standard logical device 252.

Data from the local storage device 24 that is received via the link 29 may be placed in one of the slots 244-246 of the cache 242. A corresponding pointer of the inactive one of the cache only virtual devices 254, 256 may be set to point to the received data. Subsequent data having the same sequence number may be processed in a similar manner. At some point, the local storage device 24 provides a message committing all of the data sent using the same sequence number. Once the data for a particular sequence number has been committed, the inactive one of the cache only virtual devices 254, 256 becomes active and vice versa. At that point, data from the now active one of the cache only virtual devices 254, 256 is copied to the standard logical device 252 while the inactive one of the cache only virtual devices 254, 256 is used to receive new data (having a new sequence number) transmitted from the local storage device 24 to the remote storage device 26.

As data is removed from the active one of the cache only virtual devices 254, 256 (discussed elsewhere herein), the corresponding entry in the active one of the cache only virtual devices 254, 256 may be set to null. In addition, the data may also be removed from the cache 244 (i.e., the slot returned to the pool of free slots for later use) provided that the data in the slot is not otherwise needed for another purpose (e.g., to be destaged to the standard logical device 252). A mechanism may be used to ensure that data is not removed from the cache 242 until all mirrors (including the cache only virtual devices 254, 256) are no longer using the data. Such a mechanism is described, for example, in U.S. Pat. No. 5,537,568 and in U.S. Pat. No. 6,594,742, both of which are incorporated by reference herein.

In some embodiments discussed elsewhere herein, the remote storage device 26 may maintain linked lists 258, 262 like the lists 74, 76 used by the local storage device 24. The lists 258, 262 may contain information that identifies the slots of the corresponding cache only virtual devices 254, 256 that have been modified, where one of the lists 258, 262 corresponds to one of the cache only virtual devices 254, 256 and the other one of the lists 258, 262 corresponds to the other one of the cache only virtual devices 254, 256. As discussed elsewhere herein, the lists 258, 262 may be used to facilitate restoring data from the cache only virtual devices 254, 256 to the standard logical device 252.

Figure 9:
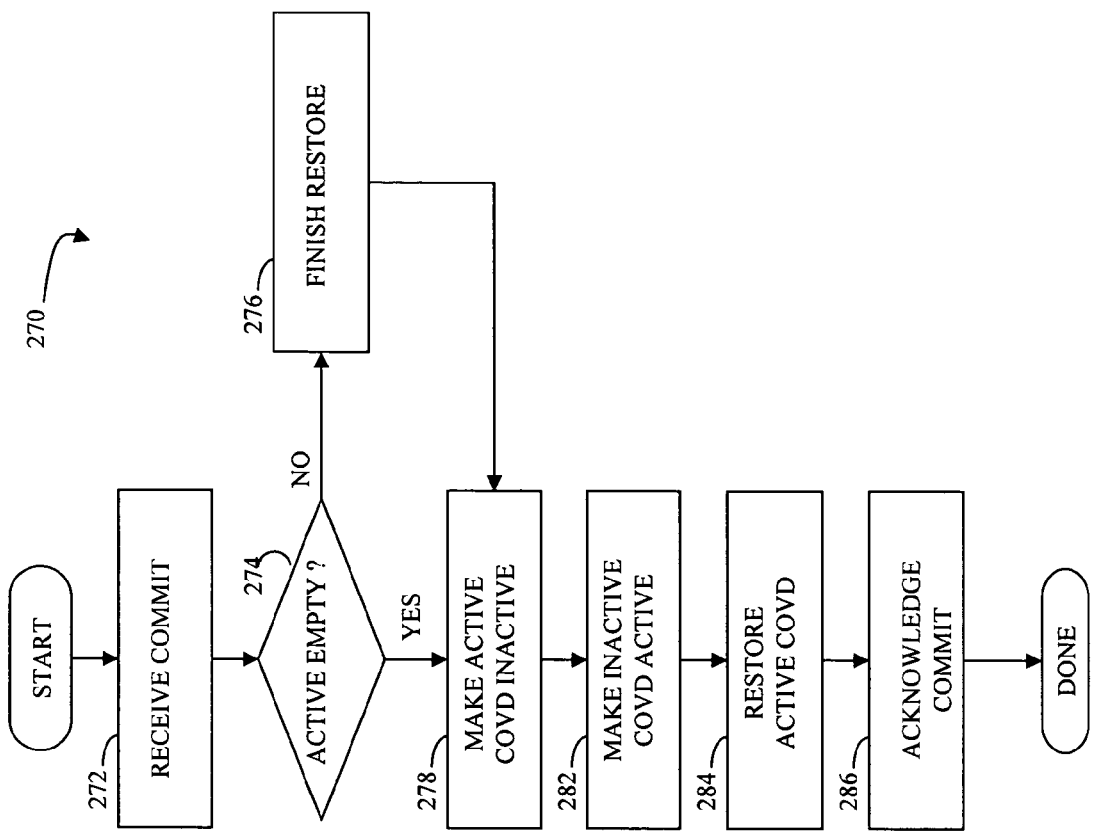
FIG. 9 is a flow chart illustrating steps performed by a remote storage device in connection with receiving a commit indicator from a local storage device according to the system described herein.

Referring to FIG. 9, a flow chart 270 illustrates steps performed by the remote storage device 26 in connection with processing in connection with a sequence number commit transmitted by the local storage device 24 to the remote storage device 26. As discussed elsewhere herein, the local storage device 24 periodically increments sequence numbers. When this occurs, the local storage device 24 finishes transmitting all of the data for the previous sequence number and then sends a commit message for the previous sequence number.

Processing begins at a first step 272 where the commit is received. Following the step 272 is a test step 274 which determines if the active one of the cache only virtual devices 254, 256 of the remote storage device 26 is empty. As discussed elsewhere herein, the inactive one of the cache only virtual devices 254, 256 of the remote storage device 26 is used to accumulate data from the local storage device 24 sent using RDF while the active one of the cache only virtual devices 254, 256 is restored to the standard logical device 252.

If it is determined at the test step 274 that the active one of the cache only virtual devices 254, 256 is not empty, then control transfers from the test step 274 to a step 276 where the restore for the active one of the cache only virtual devices 254, 256 is completed prior to further processing being performed. Restoring data from the active one of the cache only virtual devices 254, 256 is described in more detail elsewhere herein. It is useful that the active one of the cache only virtual devices 254, 256 is empty prior to handling the commit and beginning to restore data for the next sequence number.

Following the step 276 or following the step 274 if the active one of the cache only virtual devices 254, 256 is determined to be empty, is a step 278 where the active one of the cache only virtual devices 254, 256 is made inactive. Following the step 278 is a step 282 where the previously inactive one of the cache only virtual devices 254, 256 (i.e., the one that was inactive prior to execution of the step 278) is made active. Swapping the active and inactive cache only virtual devices 254, 256 at the steps 278, 282 prepares the now inactive (and empty) one of the cache only virtual devices 254, 256 to begin to receive data from the local storage device 24 for the next sequence number.

Following the step 282 is a step 284 where the active one of the cache only virtual devices 254, 256 is restored to the standard logical device 252 of the remote storage device 26. Restoring the active one of the cache only virtual devices 254, 256 to the standard logical device 252 is described in more detail hereinafter. However, note that, in some embodiments, the restore process is begun, but not necessarily completed, at the step 284. Following the step 284 is a step 286 where the commit that was sent from the local storage device 24 to the remote storage device 26 is acknowledged back to the local storage device 24 so that the local storage device 24 is informed that the commit was successful. Following the step 286, processing is complete.

Figure 10:
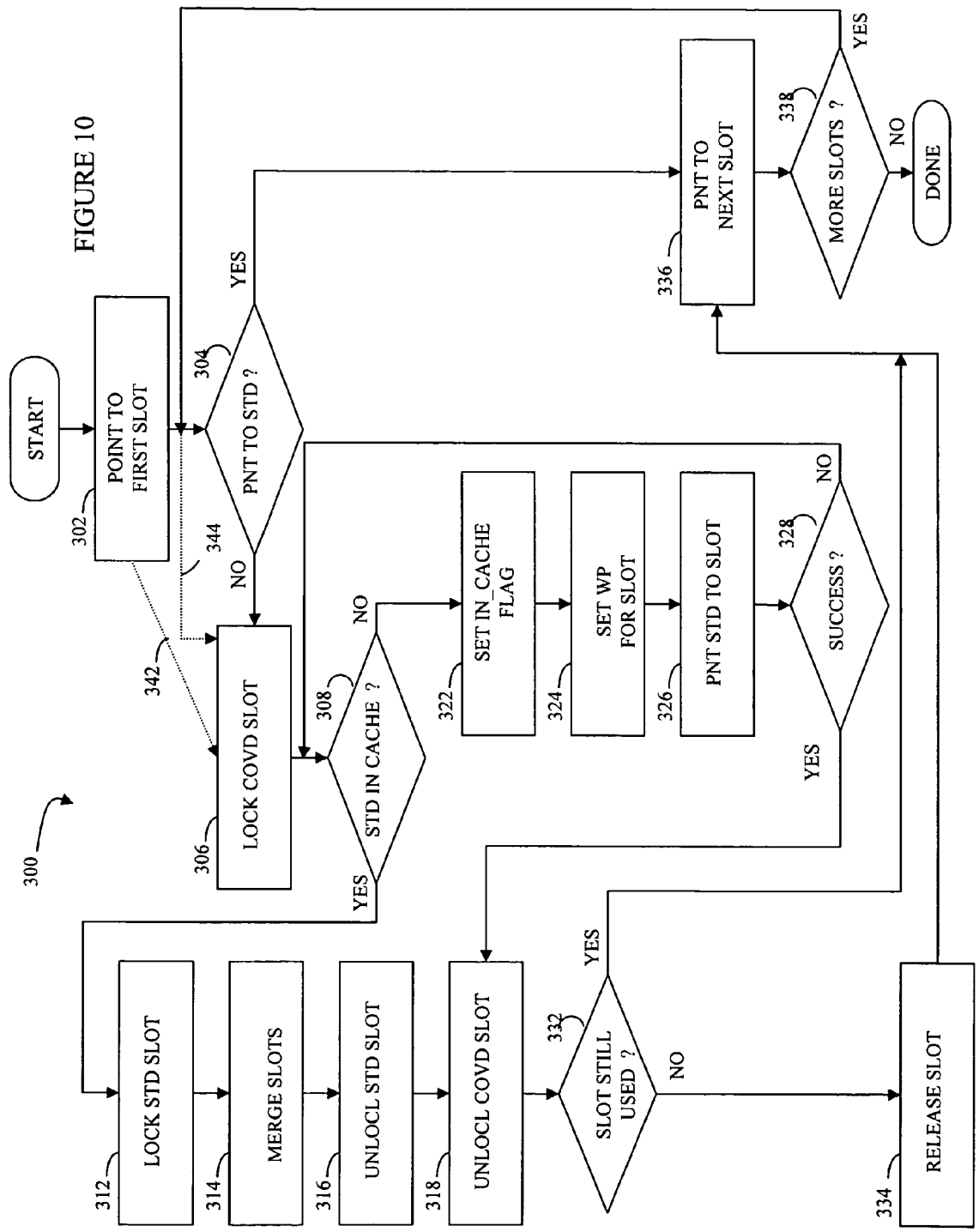
FIG. 10 is a flow chart illustrating storing transmitted data at a remote storage device according to the system described herein.

Referring to FIG. 10, a flow chart 300 illustrates in more detail the steps 276, 284 of FIG. 9 where the remote storage device 26 restores the active one of the cache only virtual devices 254, 256. Processing begins at a first step 302 where a pointer is set to point to the first slot of the active one of the cache only virtual devices 254, 256. The pointer is used to iterate through each track table entry of the active one of the cache only virtual devices 254, 256, each of which is processed individually. Following the step 302 is a test step 304 where it is determined if the track of the active one of the cache only virtual devices 254, 256 that is being processed points to the standard logical device 252. If so, then there is nothing to restore. Otherwise, control transfers from the step 304 to a step 306 where the corresponding slot of the active one of the cache only virtual devices 254, 256 is locked.

Following the step 306 is a test step 308 which determines if the corresponding slot of the standard logical device 252 is already in the cache of the remote storage device 26. If so, then control transfers from the test step 308 to a step 312 where the slot of the standard logical device is rocked. Following step 312 is a step 314 where the data from the active one of the cache only virtual devices 254, 256 is merged with the data in the cache for the standard logical device 252. Merging the data at the step 314 involves overwriting the data for the standard logical device with the new data of the active one of the cache only virtual devices 254, 256. Note that, in embodiments that provide for record level flags, it may be possible to simply OR the new records from the active one of the cache only virtual devices 254, 256 to the records of the standard logical device 252 in the cache. That is, if the records are interleaved, then it is only necessary to use the records from the active one of the cache only virtual devices 254, 256 that have changed and provide the records to the cache slot of the standard logical device 252. Following step 314 is a step 316 where the slot of the standard logical device 252 is unlocked. Following step 316 is a step 318 where the slot of the active one of the cache only virtual devices 254, 256 that is being processed is also unlocked.

If it is determined at the test step 308 that the corresponding slot of the standard logical device 252 is not in cache, then control transfers from the test step 308 to a step 322 where the track entry for the slot of the standard logical device 252 is changed to indicate that the slot of the standard logical device 252 is in cache (e.g., an IN_CACHE flag may be set). Following the step 322 is a step 324 where a flag for the track may be set to indicate that the data for the track is in the cache and needs to be destaged. As discussed elsewhere herein, in some embodiments, only records of the track having appropriate mirror bits set may need to be destaged.

Following the step 324 is a step 326 where the slot pointer for the standard logical device 252 is changed to point to the slot in the cache. Following the step 326 is a test step 328 which determines if the operations performed at the steps 322, 324, 326 have been successful. In some instances, a single operation called a "compare and swap" operation may be used to perform the steps 322, 324, 326. If these operations are not successful for any reason, then control transfers from the step 328 back to the step 308 to reexamine if the corresponding track of the standard logical device 252 is in the cache. Otherwise, if it is determined at the test step 328 that the previous operations have been successful, then control transfers from the test step 328 to the step 318, discussed above.

Following the step 318 is a test step 332 which determines if the cache slot of the active one of the cache only virtual devices 254, 256 (which is being restored) is still being used. In some cases, it is possible that the slot for the active one of the cache only virtual devices 254, 256 is still being used by another mirror. If it is determined at the test step 332 that the slot of the cache only virtual device is not being used by another mirror, then control transfers from the test step 332 to a step 334 where the slot is released for use by other processes (e.g., restored to pool of available slots, as discussed elsewhere herein). Following the step 334 is a step 336 to point to the next slot to process the next slot of the active one of the cache only virtual devices 254, 256. Note that the step 336 is also reached from the test step 332 if it is determined at the step 332 that the active one of the cache only virtual devices 254, 256 is still being used by another mirror. Note also that the step 336 is reached from the test step 304 if it is determined at the step 304 that, for the slot being processed, the active one of the cache only virtual devices 254, 256 points to the standard logical device 252. Following the step 336 is a test step 338 which determines if there are more slots of the active one of the cache only virtual devices 254, 256 to be processed. If not, processing is complete. Otherwise, control transfers from the test step 338 back to the step 304.

In another embodiment, it is possible to construct lists of modified slots for the received chunk of data 56 corresponding to the N−1 cycle on the remote storage device 26, such as the lists 258, 262 shown in FIG. 8. As the data is received, the remote storage device 26 constructs a linked list of modified slots. The lists that are constructed may be circular, linear (with a NULL termination), or any other appropriate design. The lists may then be used to restore the active one of the cache only virtual devices 254, 256.

The flow chart 300 of FIG. 10 shows two alternative paths 342, 344 that illustrate operation of embodiments where a list of modified slots is used. At the step 302, a pointer (used for iterating through the list of modified slots) is made to point to the first element of the list. Following the step 302 is the step 306, which is reached by the alternative path 342. In embodiments that use lists of modified slots, the test step 304 is not needed since no slots on the list should point to the standard logical device 252.

Following the step 306, processing continues as discussed above with the previous embodiment, except that the step 336 refers to traversing the list of modified slots rather than pointing to the next slot in the COVD. Similarly, the test at the step 338 determines if the pointer is at the end of the list (or back to the beginning in the case of a circular linked list). Also, if it is determined at the step 338 that there are more slots to process, then control transfers from the step 338 to the step 306, as illustrated by the alternative path 344. As discussed above, for embodiments that use a list of modified slots, the step 304 may be eliminated.

Figure 11:
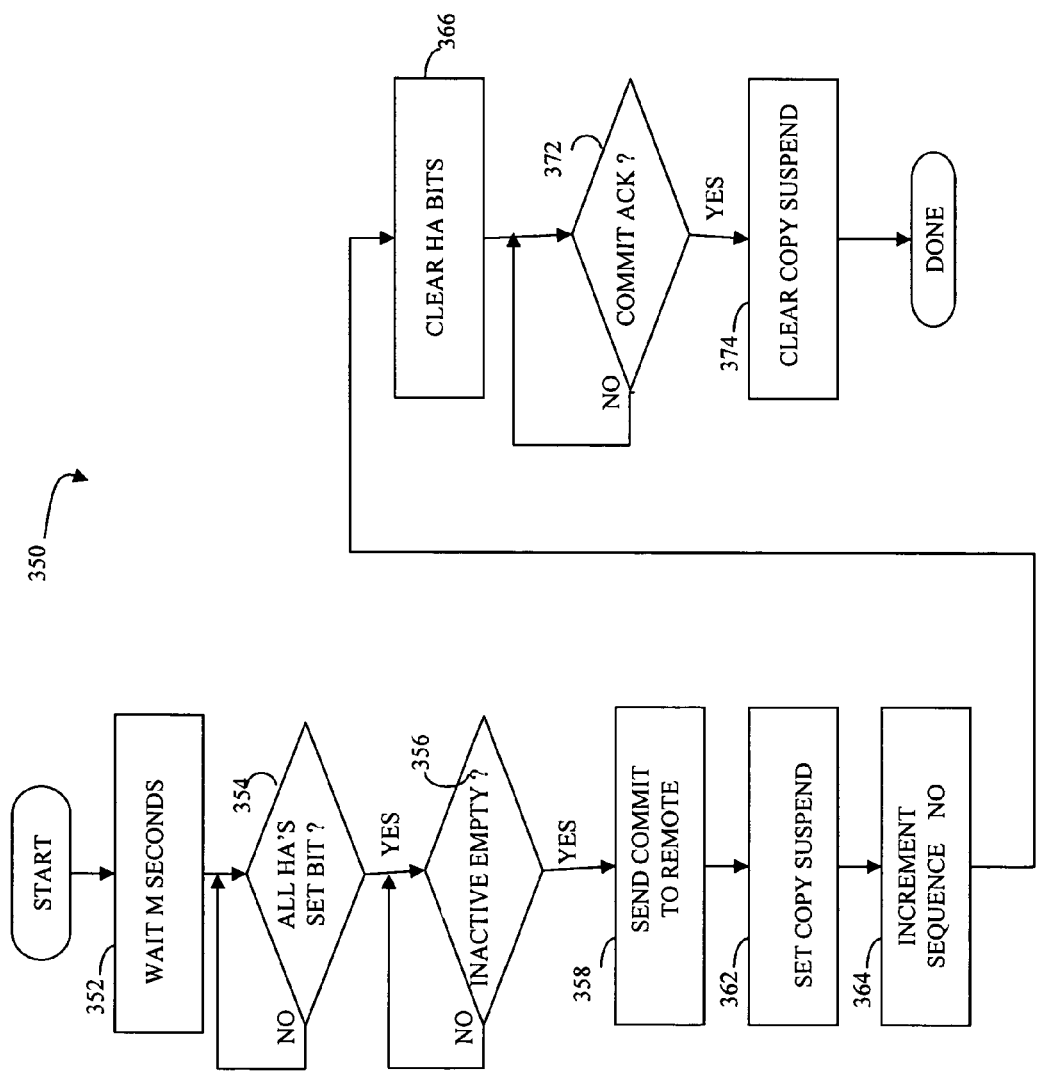
FIG. 11 is a flow chart illustrating steps performed in connection with a local storage device incrementing a sequence number according to a system described herein.

Referring to FIG. 11, a flow chart 350 illustrates steps performed in connection with the local storage device 24 increasing the sequence number. Processing begins at a first step 352 where the local storage device 24 waits at least M seconds prior to increasing the sequence number. In an embodiment herein, M is thirty, but of course M could be any number. Larger values for M increase the amount of data that may be lost if communication between the storage devices 24, 26 is disrupted. However, smaller values for M increase the total amount of overhead caused by incrementing the sequence number more frequently.

Following the step 352 is a test step 354 which determines if all of the HA's of the local storage device 24 have set a bit indicating that the HA's have completed all of the I/O's for a previous sequence number. When the sequence number changes, each of the HA's notices the change and sets a bit indicating that all I/O's of the previous sequence number are completed. For example, if the sequence number changes from N−1 to N, an HA will set the bit when the HA has completed all I/O's for sequence number N−1. Note that, in some instances, a single I/O for an HA may take a long time and may still be in progress even after the sequence number has changed. Note also that, for some systems, a different mechanism may be used to determine if all of the HA's have completed their N−1 I/O's. The different mechanism may include examining device tables in the memory 37.

If it is determined at the test step 354 that I/O's from the previous sequence number have been completed, then control transfers from the step 354 to a test step 356 which determines if the inactive one of the lists 74, 76 is empty. Note that a sequence number switch may not be made unless and until all of the data corresponding to the inactive one of the lists 74, 76 has been completely transmitted from the local storage device 24 to the remote storage device 26 using the RDF protocol. Once the inactive one of the lists 74, 76 is determined to be empty, then control transfers from the step 356 to a step 358 where the commit for the previous sequence number is sent from the local storage device 24 to the remote storage device 26. As discussed above, the remote storage device 26 receiving a commit message for a particular sequence number will cause the remote storage device 26 to begin restoring the data corresponding to the sequence number.

Following the step 358 is a step 362 where the copying of data for the inactive one of the lists 74, 76 is suspended. As discussed elsewhere herein, the inactive one of the lists is scanned to send corresponding data from the local storage device 24 to the remote storage device 26. It is useful to suspend copying data until the sequence number switch is completed. In an embodiment herein, the suspension is provided by sending a message to the RA's 30a-30c. However, it will be appreciated by one of ordinary skill in the art that for embodiments that use other components to facilitate sending data using the system described herein, suspending copying may be provided by sending appropriate messages/commands to the other components.

Following step 362 is a step 364 where the sequence number is incremented. Following step 364 is a step 366 where the bits for the HA's that are used in the test step 354 are all cleared so that the bits may be set again in connection with the increment of the sequence number. Following step 366 is a test step 372 which determines if the remote storage device 26 has acknowledged the commit message sent at the step 358. Acknowledging the commit message is discussed above in connection with FIG. 9. Once it is determined that the remote storage device 26 has acknowledged the commit message sent at the step 358, control transfers from the step 372 to a step 374 where the suspension of copying, which was provided at the step 362, is cleared so that copying may resume. Following step 374, processing is complete. Note that it is possible to go from the step 374 back to the step 352 to begin a new cycle to continuously increment the sequence number.

It is also possible to use COVD's on the R1 device to collect slots associated with active data and inactive chunks of data. In that case, just as with the R2 device, one COVD could be associated with the inactive sequence number and another COVD could be associated with the active sequence number. This is described below.

Figure 12:
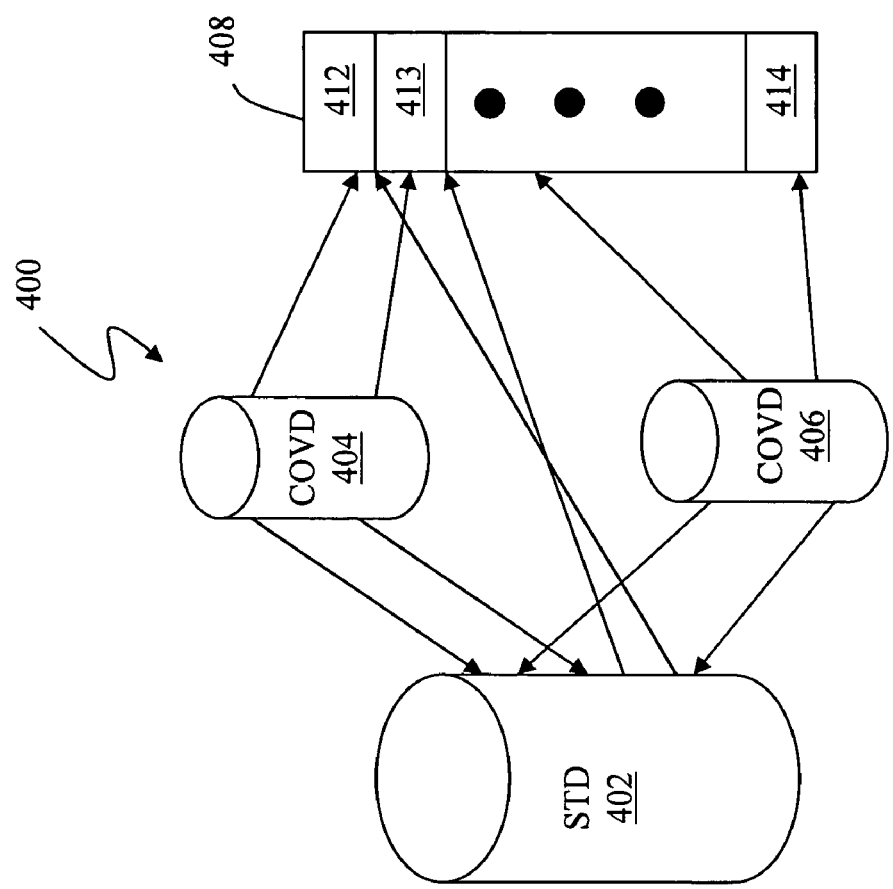
FIG. 12 is a schematic diagram illustrating items for constructing and manipulating chunks of data on a local storage device according to an alternative embodiment of the system described herein.

Referring to FIG. 12, a diagram 400 illustrates items used to construct and maintain the chunks 52, 54. A standard logical device 402 contains data written by the host 22 and corresponds to the data element 51 of FIG. 3 and the disks 33a-33c of FIG. 1. The standard logical device 402 contains data written by the host 22 to the local storage device 24.

Two cache only virtual devices 404, 406 are used in connection with the standard logical device 402. The cache only virtual devices 404, 406 corresponded device tables that may be stored, for example, in the memory 37 of the local storage device 24. Each track entry of the tables of each of the cache only virtual devices 404, 406 point to either a track of the standard logical device 402 or point to a slot of a cache 408 used in connection with the local storage device 24. In some embodiments, the cache 408 may be provided in the memory 37 of the local storage device 24.

The cache 408 contains a plurality of cache slots 412-414 that may be used in connection to writes to the standard logical device 402 and, at the same time, used in connection with the cache only virtual devices 404, 406. In an embodiment herein, each track table entry of the cache only virtual devices 404, 406 contains a null to point to a corresponding track of the standard logical device 402. Otherwise, an entry in the track table for each of the cache only virtual devices 404, 406 contains a pointer to one of the slots 412-414 in the cache 408.

Each of the cache only virtual devices 404, 406 may be used for one of the chunks of data 52, 54 so that, for example, the cache only virtual device 404 may correspond to the chunk of data 52 for sequence number N while the cache only virtual device 406 may correspond to the chunk of data 54 for sequence number N−1. Thus, when data is written by the host 22 to the local storage device 24, the data is provided to the cache 408 and an appropriate pointer of the cache only virtual device 404 is adjusted. Note that the data will not be removed from the cache 408 until the data is destaged to the standard logical device 402 and the data is also released by the cache only virtual device 404, as described elsewhere herein.

In an embodiment herein, one of the cache only virtual devices 404, 406 is deemed "active" while the other is deemed "inactive". Thus, for example, when the sequence number N is even, the cache only virtual device 404 may be active while the cache only virtual device 406 is inactive. The active one of the cache only virtual devices 404, 406 handles writes from the host 22 while the inactive one of the cache only virtual devices 404, 406 corresponds to the data that is being transmitted from the local storage device 24 to the remote storage device 26.

While the data that is written by the host 22 is accumulated using the active one of the cache only virtual devices 404, 406 (for the sequence number N), the data corresponding to the inactive one of the cache only virtual devices 404, 406 (for previous sequence number N−1) is transmitted from the local storage device 24 to the remote storage device 26. For this and related embodiments, the DA's 35*a*-35*c* of the local storage device handle scanning the inactive one of the cache only virtual devices 404, 406 to send copy requests to one or more of the RA's 30*a*-30*c* to transmit the data from the local storage device 24 to the remote storage device 26. Thus, the steps 362, 374, discussed above in connection with suspending and resuming copying, may include providing messages/commands to the DA's 35*a*-35*c*.

Once the data has been transmitted to the remote storage device 26, the corresponding entry in the inactive one of the cache only virtual devices 404, 406 may be set to null. In addition, the data may also be removed from the cache 408 (i.e., the slot returned to the pool of slots for later use) if the data in the slot is not otherwise needed for another purpose (e.g., to be destaged to the standard logical device 402). A mechanism may be used to ensure that data is not removed from the cache 408 until all mirrors (including the cache only virtual devices 404, 406) are no longer using the data. Such a mechanism is described, for example, in U.S. Pat. No. 5,537,568 issued on Jul. 16, 1996 and in U.S. patent application Ser. No. 09/850,551 filed on Jul. 7, 2001, both of which are incorporated by reference herein.

Figure 13:
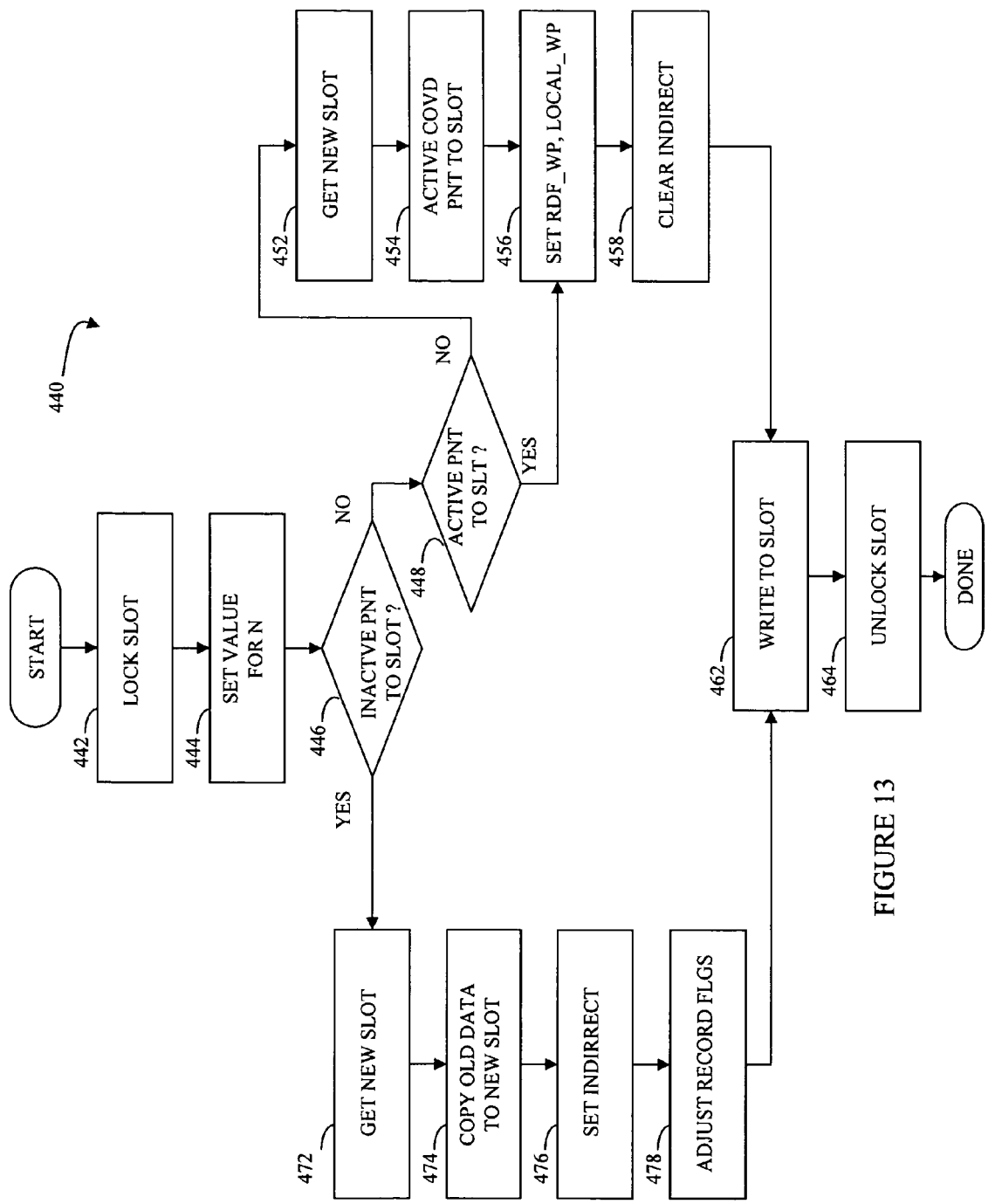
FIG. 13 is a flow chart illustrating operation of a host adaptor (HA) in response to a write by a host according to an alternative embodiment of the system described herein.

Referring to FIG. 13, a flow chart 440 illustrates steps performed by the HA 28 in connection with a host 22 performing a write operation for embodiments where two COVD's are used by the R1 device to provide the system described herein. Processing begins at a first step 442 where a slot corresponding to the write is locked. In an embodiment herein, each of the slots 412-414 of the cache 408 corresponds to a track of data on the standard logical device 402. Locking the slot at the step 442 prevents additional processes from operating on the relevant slot during the processing performed by the HA 28 corresponding to the steps of the flow chart 440.

Following the step 442 is a step 444 where a value for N, the sequence number, is set. Just as with the embodiment that uses lists rather than COVD's on the R1 side, the value for the sequence number obtained at the step 444 is maintained during the entire write operation performed by the HA 28 while the slot is locked. As discussed elsewhere herein, the sequence number is assigned to each write to set the one of the chunks of data 52, 54 to which the write belongs. Writes performed by the host 22 are assigned the current sequence number. It is useful that a single write operation maintain the same sequence number throughout.

Following the step 444 is a test step 446, which determines if the inactive one of the cache only virtual devices 404, 406 already points to the slot that was locked at the step 442 (the slot being operated upon). This may occur if a write to the same slot was provided when the sequence number was one less than the current sequence number. The data corresponding to the write for the previous sequence number may not yet have been transmitted to the remote storage device 26.

If it is determined at the test step 446 that the inactive one of the cache only virtual devices 404, 406 does not point to the slot, then control transfers from the test step 446 to another test step 448, where it is determined if the active one of the cache only virtual devices 404, 406 points to the slot. It is possible for the active one of the cache only virtual devices 404, 406 to point to the slot if there had been a previous write to the slot while the sequence number was the same as the current sequence number. If it is determined at the test step 448 that the active one of the cache only virtual devices 404, 406 does not point to the slot, then control transfers from the test step 448 to a step 452 where a new slot is obtained for the data. Following the step 452 is a step 454 where the active one of the cache only virtual devices 404, 406 is made to point to the slot.

Following the step 454, or following the step 448 if the active one of the cache only virtual devices 404, 406 points to the slot, is a step 456 where flags are set. At the step 456, the RDF_WP flag (RDF write pending flag) is set to indicate that the slot needs to be transmitted to the remote storage device 26 using RDF. In addition, at the step 456, the LOCAL_WP flag is set to indicate that the slot needs to be destaged to the standard logical device 402. Note that, in some instances, if the active one of the cache only virtual devices 404, 406 already points to the slot (as determined at the step 448) it is possible that the RDF_WP and LOCAL_WP flags were already set prior to execution of the step 456. However, setting the flags at the step 456 ensures that the flags are set properly no matter what the previous state.

Following the step 456 is a step 458 where an indirect flag in the track table that points to the slot is cleared, indicating that the relevant data is provided in the slot and not in a different slot indirectly pointed to. Following the step 458 is a step 462 where the data being written by the host 22 and the HA 28 is written to the slot. Following the step 462 is a step 464 where the slot is unlocked. Following step 464, processing is complete.

If it is determined at the test step 446 that the inactive one of the cache only virtual devices 404, 406 points to the slot, then control transfers from the step 446 to a step 472, where a new slot is obtained. The new slot obtained at the step 472 may be used for the inactive one of the cache only virtual devices 404, 406 to effect the RDF transfer while the old slot may be associated with the active one of the cache only virtual devices 404, 406, as described below.

Following the step 472 is a step 474 where the data from the old slot is copied to the new slot that was obtained at the step 472. Following the step 474 is a step 476 where the indirect flag (discussed above) is set to indicate that the track table entry for the inactive one of the cache only virtual devices 404, 406 points to the old slot but that the data is in the new slot which is pointed to by the old slot. Thus, setting indirect flag at the step 476 affects the track table of the inactive one of the cache only virtual devices 404, 406 to cause the track table entry to indicate that the data is in the new slot.

Following the step 476 is a step 478 where the mirror bits for the records in the new slot are adjusted. Any local mirror bits that were copied when the data was copied from the old slot to the new slot at the step 474 are cleared since the purpose of the new slot is to simply effect the RDF transfer for the inactive one of the cache only virtual devices. The old slot will be used to handle any local mirrors. Following the step 478 is the step 462 where the data is written to the slot. Following step 462 is the step 464 where the slot is unlocked. Following the step 464, processing is complete.

Figure 14:
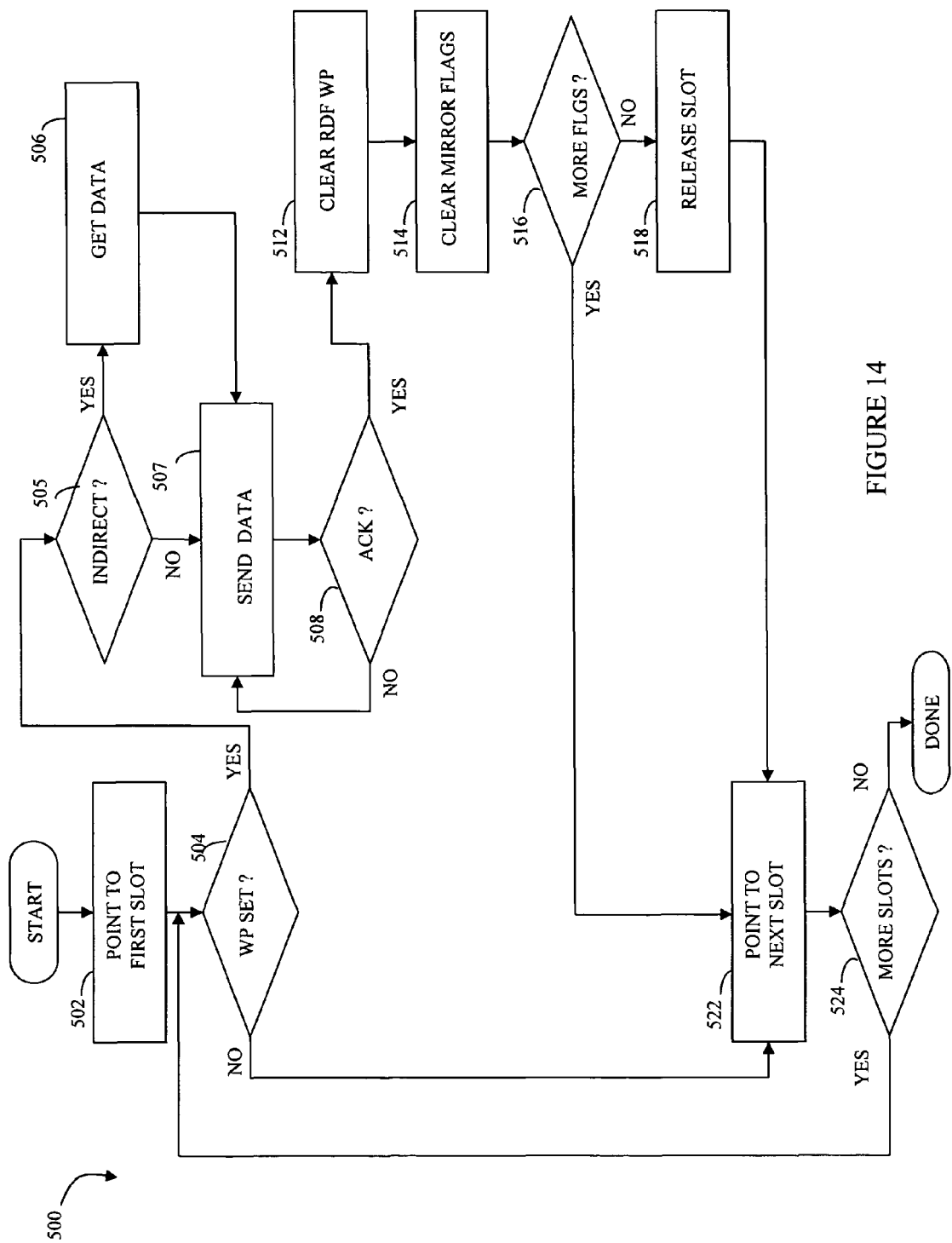
FIG. 14 is a flow chart illustrating transferring data from a local storage device to a remote storage device according to an alternative embodiment of the system described herein.

Referring to FIG. 14, a flow chart 500 illustrates steps performed in connection with the local storage device 24 transmitting the chunk of data 54 to the remote storage device 26. The transmission essentially involves scanning the inactive one of the cache only virtual devices 404, 406 for tracks that have been written thereto during a previous iteration when the inactive one of the cache only virtual devices 404, 406 was active. In this embodiment, the DA's 35a-35c of the local storage device 24 scan the inactive one of the cache only virtual devices 404, 406 to copy the data for transmission to the remote storage device 26 by one or more of the RA's 30a-30c using the RDF protocol.

Processing begins at a first step 502 where the first track of the inactive one of the cache only virtual devices 404, 406 is pointed to in order to begin the process of iterating through all of the tracks. Following the first step 502 is a test step 504 where it is determined if the RDF_WP flag is set. As discussed elsewhere herein, the RDF_WP flag is used to indicate that a slot (track) contains data that needs to be transmitted via the RDF link. The RDF_WP flag being set indicates that at least some data for the slot (track) is to be transmitted using RDF. In an embodiment herein, the entire slot is not transmitted. Rather, only records within the slot that have the appropriate mirror bits set (indicating the records have changed) are transmitted to the remote storage device 26. However, in other embodiments, it may be possible to transmit the entire slot, provided that the remote storage device 26 only writes data corresponding to records having appropriate mirror bits set and ignores other data for the track, which may or may not be valid.

If it is determined at the test step 504 that the cache slot being processed has the RDF_WP flag set, then control transfers from the step 504 to a test step 505, where it is determined if the slot contains the data or if the slot is an indirect slot that points to another slot that contains the relevant data. In some instances, a slot may not contain the data for the portion of the disk that corresponds to the slot. Instead, the slot may be an indirect slot that points to another slot that contains the data. If it is determined at the step 505 that the slot is an indirect slot, then control transfers from the step 505 to a step 506, where the data (from the slot pointed to by the indirect slot) is obtained. Thus, if the slot is a direct slot, the data for being sent by RDF is stored in the slot while if the slot is an indirect slot, the data for being sent by RDF is in another slot pointed to by the indirect slot.

Following the step 506 or the step 505 if the slot is a direct slot is a step 507 where data being sent (directly or indirectly from the slot) is copied by one of the DA's 35a-35c to be sent from the local storage device 24 to the remote storage device 26 using the RDF protocol. Following the step 507 is a test step 508 where it is determined if the remote storage device 26 has acknowledged receipt of the data. If not, then control transfers from the step 508 back to the step 507 to resend the data. In other embodiments, different and more involved processing may used to send data and acknowledge receipt thereof. Such processing may include error reporting and alternative processing that is performed after a certain number of attempts to send the data have failed.

Once it is determined at the test step 508 that the data has been successfully sent, control passes from the step 508 to a step 512 to clear the RDF_WP flag (since the data has been successfully sent via RDF). Following the step 512 is a step 514 where appropriate mirror flags are cleared to indicate that at least the RDF mirror (R2) no longer needs the data. In an embodiment herein, each record that is part of a slot (track) has individual mirror flags indicating which mirrors use the particular record. The R2 device is one of the mirrors for each of the records and it is the flags corresponding to the R2 device that are cleared at the step 514.

Following the step 514 is a test step 516 which determines if any of the records of the track being processed have any other mirror flags set (for other mirror devices). If not, then control passes from the step 516 to a step 518 where the slot is released (i.e., no longer being used). In some embodiments, unused slots are maintained in a pool of slots available for use. Note that if additional flags are still set for some of the records of the slot, it may mean that the records need to be destaged to the standard logical device 402 or are being used by some other mirror (including another R2 device). Following the step 518, or following the step 516 if more mirror flags are present, is a step 522 where the pointer that is used to iterate through each track entry of the inactive one of the cache only virtual devices 404, 406 is made to point to the next track. Following the step 522 is a test step 524 which determines if there are more tracks of the inactive one of the cache only virtual devices 404, 406 to be processed. If not, then processing is complete. Otherwise, control transfers back to the test step 504, discussed above. Note that the step 522 is also reached from the test step 504 if it is determined that the RDF_WP flag is not set for the track being processed.

In another embodiment of the system described herein, it is possible to not use COVD's for the R2 device like those shown in the diagram 240 of FIG. 8. That is, it is possible to implement the R2 receipt of asynchronous data without using COVD's at the R2 device.

Figure 15:
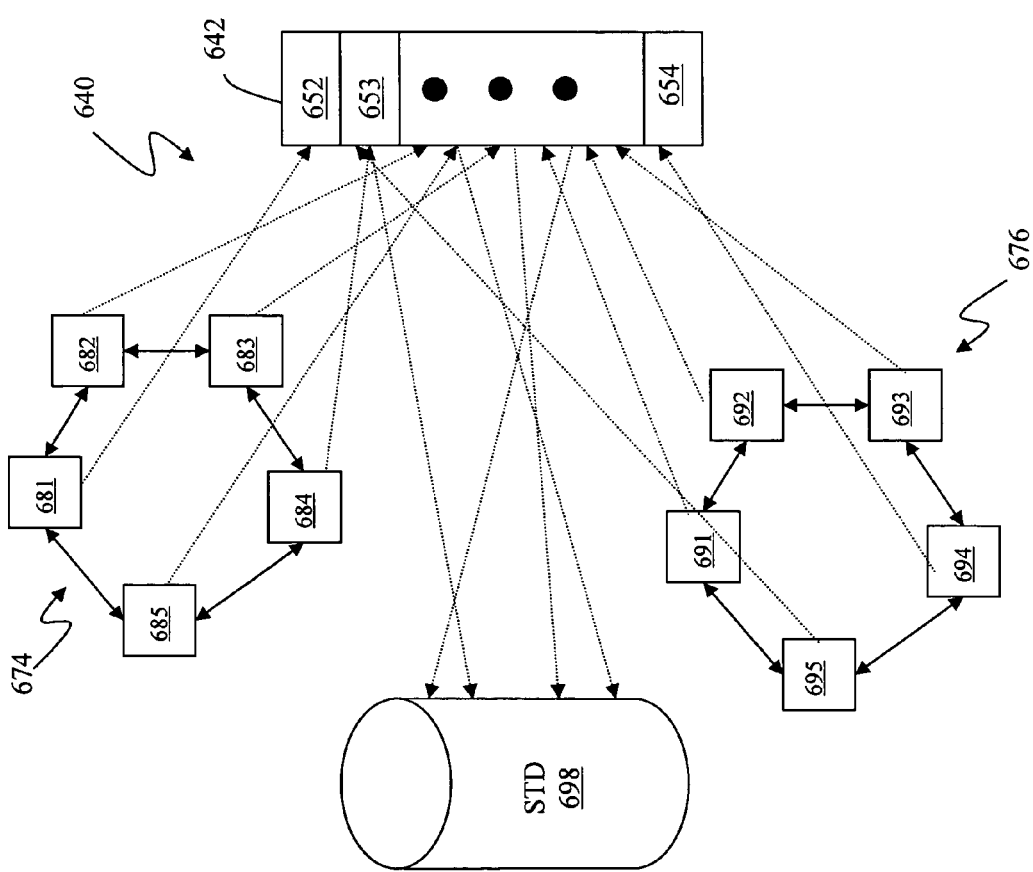
FIG. 15 is a schematic diagram illustrating items for constructing and manipulating chunks of data on a remote storage device according to the system described herein.

Referring to FIG. 15, a diagram 640 shows a cache 642 that is provided in the remote storage device 26 that receives data. The cache 642 includes a plurality of slots 652-654 in which asynchronous data that is received from the local storage device 24 is placed. Also shown is a first circularly linked list 674 and a second circularly linked list 676 which contain pointers to the slots 652-654 of the cache 642. Thus, for example, the circularly linked list 674 includes a plurality of pointers 681-685, each of which points to one of the slots 652-654 in the cache 642. Similarly, the circularly linked list 676 includes a plurality of pointers 691-695, each of which points to one of the slots 652-654 of the cache 642. A standard logical device 698 is also mapped to portions of the cache 642.

In an embodiment herein, one of the lists 674, 676 corresponds to an inactive data chunk (e.g., like the chunk 56 shown in FIG. 3), while the other one of the lists 674, 676 corresponds to an active data chunk (e.g., like the chunk 58 of FIG. 3). Received data is accumulated using an inactive one of the data chunks while the active one of the data chunks is used for storing data at the standard logical device 698 as described elsewhere herein in connection with the diagram 240 of FIG. 8 and the corresponding text. Thus, as new data arrives, it is placed in the cache 642 and a new pointer is added to which one of the circularly linked lists 674, 676 corresponds to the inactive data chunk when the data is received.

In some instances, it may be useful to be able to determine whether a portion of the standard logical device 698 (or any other logical device) has a slot associated therewith in the cache 642 corresponding to received data. Of course, it is always possible to traverse both of the lists 674, 676 to determine if there is a corresponding slot in the cache 642. However, it would be more useful if there were a way of using particular device, cylinder, and head values of a logical device to determine whether there is a corresponding one of the slots 652-654 in the cache 642 waiting to be destaged to the device.

Figure 16:
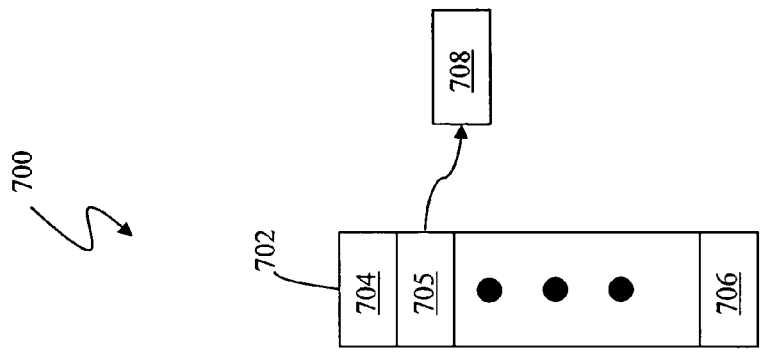
FIG. 16 is a diagram showing a table used to map logical device locations to slots containing data received by a remote storage device according to the system described herein.

Referring to FIG. 16, a diagram 700 shows a hash table 702 which contain a plurality of entries 704-706. In an embodiment herein, each of the entries 704-706 either contains a null pointer or points to one of the cache slots 652-654 that correspond to data that has been received but not yet stored on the standard logical device 698 (or another standard logical device). The table 702 is indexed using a hash function that performs a mathematical operation using the particular values of the device, cylinder, and head to generate an index into the table 702 to find the corresponding entry. Thus, when data is received by the R2 device, the hash function is applied to the device, cylinder, and head to find its index value into the table 702 and then a pointer is written to the corresponding one of the entries 704-706 that points to the particular slot 652-654 in the cache 642. Once the received data is appropriately destaged to the standard logical device 698 (or another device), the corresponding one of the entries 704-706 is set to null. In this way, the hash table 702 allows quickly determining whether a particular portion of a standard logical device corresponds to received data that has not yet been destaged. For the system described herein, any appropriate hash function may be used to generate the index into the table 702.

In some instances, it may possible for a particular device, cylinder, and head values to generate an index into the table 702 that is the same as an index generated by different values for the device, cylinder, and head. This is called a "collision". In instances where collisions occur, a second entry into the table 702 corresponding to the same index as provided and the second entry is linked to the first entry so that a particular index would correspond to more than one entry. This is illustrated by an element 708 that is linked to the element 705 of the table 702. Thus, a first device, cylinder, and head are hashed to generate and index to the entry 705 while different device, cylinder, and head are input to the hash function to generate the same value for the index. In an embodiment herein, the entry 705 is used to point to the data in the cache 642 corresponding to the first device, cylinder, and head while the entry 708 is used to point to data in the cache 642 corresponding to the second device, cylinder and head. Of course, as data is destaged to an appropriate device, the corresponding one of the entries 705, 708 may be eliminated from the table 700.

Note that any number of entries may correspond to a single index so that, for example, if collisions occur that cause three separate sets of values for device, cylinder, and head to generate the same index, then there would be three (or more) entries linked together at a particular index into the table 702. Note also that other appropriate techniques may be used to handle collisions, including providing additional tables (e.g., a second table, a third table, a fourth table, etc.).

Referring to FIG. 17, a diagram 720 shows an alternative embodiment of a hash table 722 which contain a plurality of entries 724-726. The embodiment of FIG. 17 is like the embodiment of FIG. 16, with a few differences, as described herein. Each of the entries 724-726 either contains a null pointer or points to one of the cache slots 728, 732, 734, shown in the diagram 720, that correspond to data that has been received but not yet stored on the standard logical device 698 (or another standard logical device). The table 722 is indexed using a hash function that performs a mathematical operation using the particular values of the device, cylinder, and head to generate an index into the table 722 to find the corresponding entry. Thus, when data is received by the R2 device, the hash function is applied to the device, cylinder, and head to find its index value into the table 722 and then a pointer is written to the corresponding one of the entries 724-726 that points to the particular slot 728, 732, 734. Once the received data is appropriately destaged to the standard logical device 698 (or another device), the corresponding one of the entries 724-726 is adjusted appropriately. In this way, the hash table 722 allows quickly determining whether a particular portion of a standard logical device corresponds to received data that has not yet been destaged. For the system described herein, any appropriate hash function may be used to generate the index into the table 722.

For the embodiment shown in FIG. 17, in instances where collisions occur, the first slot pointed to by a table entry points to the second slot that caused the collision. Thus, for example, if the slot 732 and a slot 736 cause a collision at the table entry 725, the table entry 725 points to the slot 732 while the slot 732 points to the slot 736. Thus, a collision does not cause any change in the table 722 when the subsequent slot is added, since adding the subsequent slot simply involves changing the pointer value for a previous slot. Of course, any number of slots may correspond to a single table entry.

Note that any number of entries may correspond to a single index so that, for example, if collisions occur that cause three separate sets of values for device, cylinder, and head to generate the same index, then there would be three (or more) entries linked together at a particular index into the table 702. Note also that other appropriate techniques may be used to handle collisions, including providing additional tables (e.g., a second table, a third table, a fourth table, etc.).

In some instances, a significant amount of data may be accumulating in the chunks 52, 54 of the local storage device 24 and/or in the chunks 56, 58 of the R2 remote storage device 26, all of which are maintained in the cache memory of the storage devices 24, 26. In addition, the system may be affected by unrelated processes that may also use significant amounts of cache memory space. These issues may be addressed by providing a mechanism to temporarily store at least some of the chunk data for a storage device on a corresponding local disk of the storage device. Thus, for example, chunk data in the cache memory of the storage device 24 may be stored on one or more of the local disks 33a-33c while chunk data in the cache memory of the storage device 26 may be stored on one or more of the local disks 34a-34c. The chunk data may be maintained on a local disk until it is appropriate to restore the data back to the cache memory (i.e., until there is sufficient room in the cache memory to hold the data). Accordingly, as the available (free) cache memory space decreases, more chunk data is stored on a local disk. As the available (free) cache memory space increases, chunk data is restored from the local disk to the cache memory. In an embodiment herein, the system operates in three modes: a GREEN mode in which chunk data that has been temporarily stored on a local disk is restored to the cache memory, a RED mode in which chunk data is temporarily stored on a local disk, and a YELLOW mode in which chunk data is neither stored nor restored.

Figure 18:
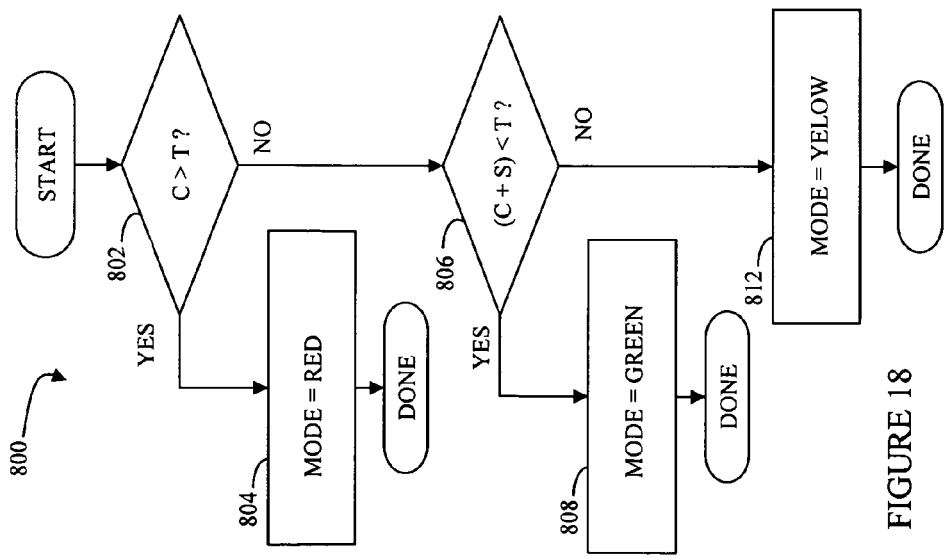
FIG. 18 is a flow chart illustrating processing performed in connection with determining when to store cache memory data to a local disk and when to restore cache memory data from a local disk according to the system described herein.

Referring to FIG. 18, a flow chart 800 illustrates steps performed in connection with providing the processing described herein to determine if chunk data in the cache memory needs to be temporarily stored on a local disk or if the chunk data is to be restored from the local disk back to the cache memory. Cache memory for one of the chunks 52, 54 may be stored on a local disk for the local storage device 24 while cache memory for one of the chunks of 56, 58 may be stored on a local disk for the remote storage device 26.

Processing begins at a first test step 802 where it is determined if the amount of data in the cache memory (C) has exceeded a predetermined threshold (T). The predetermined threshold may be set according to a variety of functional factors, including measured (observed) performance of the system with different values for the threshold. In an embodiment herein, the predetermined threshold may be set to 80% of the total amount of memory in the cache memory, although other settings are possible.

If it is determined at the test step 802 that the amount of data stored in the cache memory (C) has exceeded the predetermined threshold (T), then control transfers from the test step 802 to a step 804 where the mode is set to RED. As described elsewhere herein, when the mode is RED, chunk data from the cache memory is stored on a local disk. Following the step 804, processing is complete.

If it is determined at the test step 802 that the amount of data in the cache memory (C) does not exceed the predetermined threshold (T), then control transfers from the test step 802 to a test step 806 where it is determined if the sum of the amount of data in the cache memory (C) and the amount of data from the chunks that has already been stored locally (S) is less than the predetermined threshold (T). If so, then control transfers from the test step 806 to a step 808 were the mode is set to GREEN. Note that the test at the step 806 determines if there is enough room in the cache memory to restore all of the stored chunk data to the cache memory. If so, then setting up the mode to GREEN allows for restoring chunk data from the local disks to the cache memory. Following the step 808, processing is complete. Note that other tests/criteria may be used to set the system to the GREEN mode.

In instances where it is not appropriate to place the system in either the GREEN mode or the RED mode, control transfers to a step 812 where the mode is set to YELLOW. As discussed elsewhere herein, when the mode is set to YELLOW, chunk data is neither stored nor restored.

The process illustrated by the flow chart 800 may be periodically executed to set the mode for the system as conditions change. In an embodiment herein, the process may be executed every half second, although other periods are possible, including variable length periods. Note that although the flow chart 800 has been illustrated using a single threshold (T) at various test steps, it is also possible to use different thresholds that are not the same.

Figure 19:
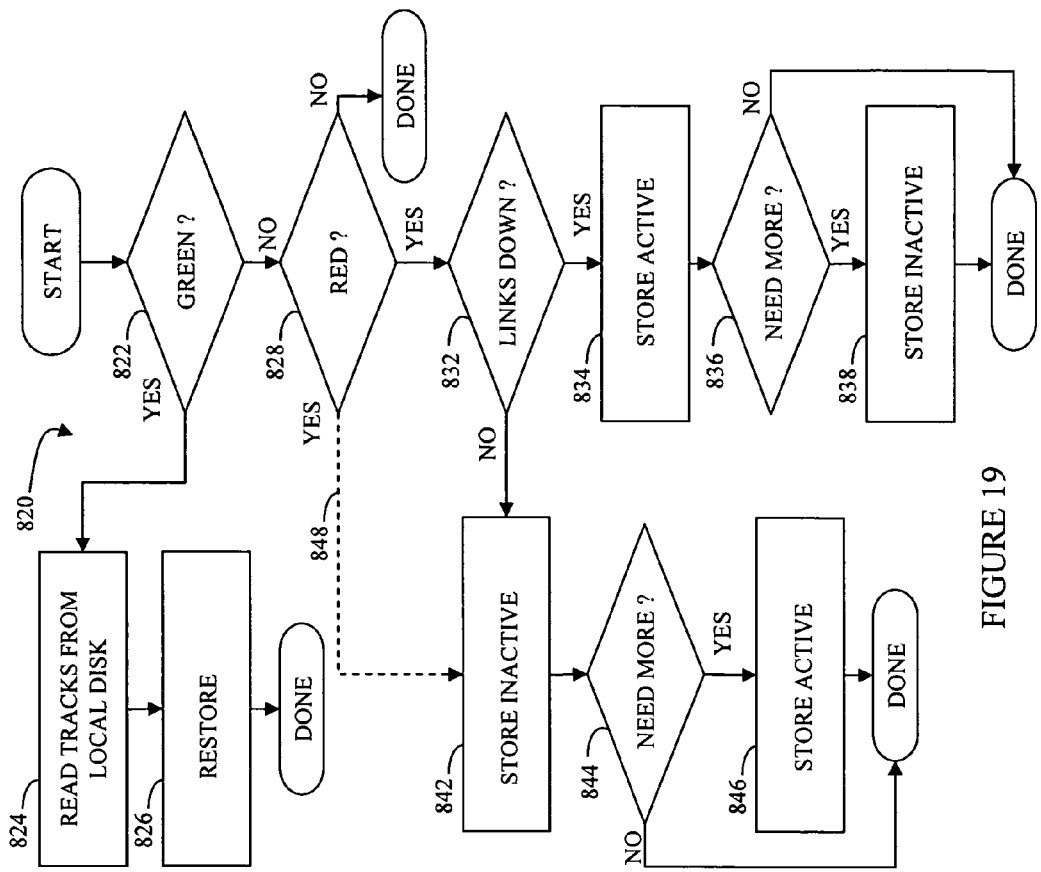
FIG. 19 is a flow chart illustrating storing and restoring data between a cache memory and a local disk according to the system described herein.

Referring to FIG. 19, a flow chart 820 illustrates steps performed based on the setting for the mode. Just as with the flow chart 800, the process illustrated by the flow chart 820 may be periodically executed. And in embodiment herein, the process illustrated by the flow chart 820 may be executed each time the process illustrated by the flow chart 800 is executed, although it is possible for the processes illustrated by the flow charts 800, 820 to be asynchronous and/or to run at different frequencies.

Processing begins at a first test step 822 where it is determined if the mode is GREEN. If so, then control transfers from the test step 822 to a step 824 to read into the cache memory tracks from the logical device to which the cache memory slots corresponding to chunks of data are stored. In an embodiment herein, data from the cache memory that is stored to a local disk is provided to one or more logical storage devices created for that purpose. At the step 824, a subset of contiguous tracks on the logical device used to store the chunk data is read into the cache memory. Following the step 824 is a step 826 where a restore operation is performed on the chunk data that was read into cache memory so that the data is restored into cache slots. The restore operation performed at the step 826 is described in more detail elsewhere herein. Following the step 826, processing is complete.

If it is determined at the test step 822 that the system is not in the GREEN mode, then control transfers from the test step 822 to a test step 828 where it is determined if the system is in the RED mode. If not, then processing is complete. Otherwise, control transfers from the test step 828 test step 832 where it is determined if the link 29 between the local storage device 24 and the remote storage device 26 is operational. Note that one possible reason for chunk data accumulating in the cache memory of the local storage device 24 is that the link between the local storage device 24 and the remote storage device 26 is not operational so that data is not transmitted from the local storage device 24 to the remote storage device 26. Note also that a failure of the remote storage device 26 effectively provides the same result to the local storage device 24. Accordingly, the test at the step 832 may include any condition where the local storage device 24 is incapable of transmitting data therefrom or, if capable of transmitting, any condition where the data that is transmitted is not acknowledged by the receiver (remote storage device 26).

If it is determined at the test step 832 that the links are operational, then control transfers from the test step 832 to a step 834 where the active cycle data (e.g., the chunk of 52 at the local storage device 24) is stored. Note that, if the links are operational and data from the chunk 54 is being drained from the local storage device 24 to the chunk 56 of the remote storage device 26, then it may be useful to attempt to reduce the chunk data stored in the cache memory of the local storage device 24 by first storing chunk data from the active cycle (the chunk 52). In an embodiment herein, storing a particular chunk of data may be facilitated by accessing data structures described herein to traverse through the slots corresponding to a particular chunk.

Following the step 834 is a test step 836 where it is determined if more space in the cache memory is needed. The test at the step 836 may use the same criteria to determine if the system should be in the RED mode or may use some other test. If it is determined at the test step 836 that more free space is not needed in the cache memory, then processing is complete. Otherwise, control transfers from the test step 836 to a step 838 to store additional chunk data, this time from the inactive cycle (e.g., data from the chunk 54 on the local storage device 24). Following the step 838, processing is complete.

If is determined at the test step 832 that the links are not operational (or, as discussed elsewhere herein, the remote storage device 26 is not receiving data, etc.), then control transfers from the test step 832 to a step 842 to store data from the inactive cycle (e.g., the chunk 54 at the local storage device 24 or the chunk 56 at the remote storage device 26). Following the step 842 is a test step 844 where it is determine if more space is needed in the cache memory. The test at the step 844 is like the test at the step 836. If it is determined at the test step 844 that more space is not needed, then processing is complete. Otherwise, control transfers from the test step 844 to a step 846 to store chunk data from the active cycle (e.g., the chunk 52 of the local storage device 24 or the chunk 58 of the remote storage device 26). Following the step 846, processing is complete.

Note that, generally, the state of the link 29 between the local storage device 24 and the remote storage device 26 does not affect the remote storage device 26 in the same way as the local storage device 24. Accordingly, the test performed at the step 832 is not necessarily pertinent when determining what actions to take at the remote storage device 26. This is illustrated by an alternative path 848 from the test step 828 to the step 842 when it is determined that the system is in the RED mode. In such a case, the remote storage device 26 would, irrespective of the state of the links, initially store chunk data from the inactive cycle before storing data from the active cycle as described above and illustrated by the steps 842, 844, 846.

Referring to FIG. 20, a spillover slot 860 is used to maintain information for a plurality of cache memory slots that have been stored on a local disk. In an embodiment herein, the spillover slot 860 uses as much space as a conventional cache memory slot (data for a one track), but actually contains information for up to five hundred and twelve different cache memory slots that have stored on a local disk.

The spillover slot 860 includes a header 861 that contains information identifying the spillover slot 860 as a spillover slot. The header 861 may also contain a bitmap (or similar) indicating which of a number of metadata entries (described in detail below) are being used. Accordingly, the bitmap of the header would make it fairly straightforward to determine if the spillover slot 860 could hold additional information for more tracks being stored and, if so, where in the spillover slot 860 that additional information should be placed.

The spillover slot 860 also contains a plurality of catalog entries 862-864 that point to specific metadata entries (described below) within the spillover slot 860. Thus, the catalog entries 862-864 indicate a (relatively small) displacement within the spillover slot 860 where additional information may be found. Use of the catalog entries 862-864 is described in more detail elsewhere herein.

The spillover slot 860 also contains a plurality of metadata entries 866-868. Each of the metadata entries 866-868 describes a particular cache slot that had been removed from the cache memory and stored on a local disk. Each of the catalog entries 862-864 may point to a single one of the metadata entries 866-868 or may contain a null pointer indicator such as zero or negative one (or some other value indicating that a particular one of the catalog entries 862-864 does not point to anything). In an embodiment herein, the spillover slot 860 may be provided in any location in the cache memory that could otherwise hold a conventional cache memory slot. In other embodiments, it is possible to provide a separate storage area for the spillover slot 860 (and other spillover slots).

Referring to FIG. 21, a metadata entry 900 corresponding to one of the metadata entries 866-868 is shown in detail. The metadata entry 900 includes source information 902-904 that describes the device, cylinder, and head to indicate the track on the source storage device that corresponds to the data that had been in the cache memory. The metadata entry 900 also includes destination information 906-908 that indicates the device, cylinder, and head of the local disk for the track stored from the cache memory. In an embodiment herein, data that is stored from the cache memory is provided to one or more logical devices that are specifically allocated for the purpose of receiving data stored from the cache memory. The logical devices may be maintained in a pool of logical devices that is accessed as appropriate.

The metadata entry 900 may also include a hash key forward pointer 912 and a hash key reverse pointer 914. As discussed elsewhere herein, it is possible to maintain a table of pointers that point to slots in the inactive and active cycles of the storage devices 24, 26. In an embodiment herein, the values for the source information 902-904 may be used to generate the hash key associated with a particular slot. For slots that hash to the same value (i.e., generate a collision) a hash chain is constructed where the slots are interconnected by a doubly linked list using forward pointers (e.g., the hash key forward pointer 912) and reverse pointers (e.g., the hash key reverse pointer 914). Note that a hash chain can consist of zero or more metadata entries and zero or more conventional slots interconnected in any order. In an embodiment herein, the hash key forward pointer 912 and the hash key reverse pointer 914 may be represented as index values when pointing to other metadata entries within the same spillover slot 860 and may otherwise be represented using conventional cache slot pointers (e.g., pointers to memory, cache slot number index, etc.).

The metadata entry 900 may also include a catalog key forward pointer 916 and a catalog key reverse pointer 918. In the system described herein, the catalog entries 862-864 may be used as a secondary hash table to locate the metadata entry 900 in a particular location within the metadata entries 866-868. In an embodiment herein, the catalog entries 862-864, the catalog key forward pointer 916, and the catalog key reverse pointer 918 only point to the metadata entries 866-868 within the single spillover slot 860 and thus are used only for navigating within a single spillover slot. Just as with the hash key forward pointer 912 and the hash key reverse pointer 914, the catalog key forward pointer 916 and the catalog key reverse pointer 918 are used to construct a doubly linked list of the metadata entries in which the secondary hash operation results in the same value.

A second slot pointer 922 points to a slot in the cache memory that corresponds to the same track as a slot stored on the local disk for the metadata entry 900. In some cases, it is possible to first store a cache slot for a track on the local disk and then write more data to the same track creating a new cache slot for the track. When that happens, there are, in effect, two cache slots for the same track: the slot that is actually in the cache and the track that had been in cache prior to being stored on the local disk. In such a case, the second slot pointer 922 is made to point to the slot in the cache memory. Use of the second slot pointer 922 is discussed in more detail elsewhere herein. Note, by the way, that the version of the slot in the cache memory is generally more up-to-date than the version of the slot stored on the local disk.

The metadata entry 900 also has an additional info field 924, which may contain additional useful data, such as track record flags, track format information, etc. Any appropriate data may be provided in connection with the additional info field 924.

Figure 22:
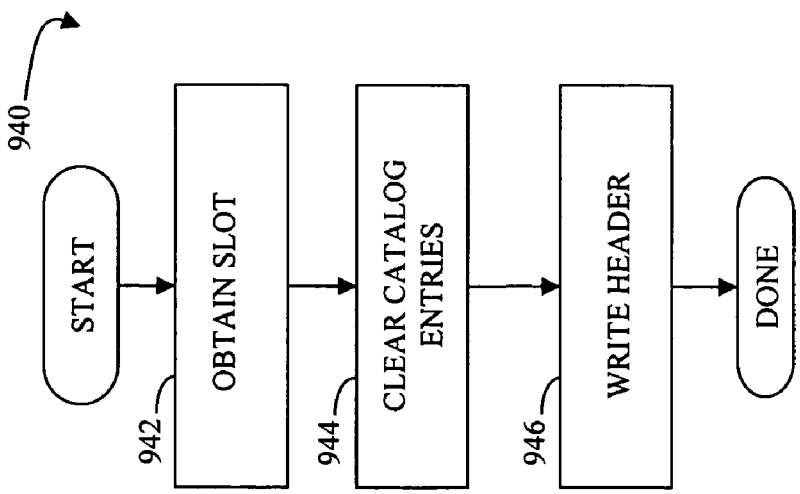
FIG. 22 is a flow chart illustrating creating a new spillover slot according to the system described herein.

Referring to FIG. 22, a flow chart 940 illustrates steps performed in connection with creating a new spillover slot like the spillover slot 860 illustrated in FIG. 20. Processing begins at a first step 942 where a slot is obtained from the cache memory in a conventional fashion. Following the step 942 is a step 944 where the catalog entries 862-864 are cleared (or otherwise set to be null pointers) so that the entries 862-864 do not point to any of the metadata entries 866-868. Following the step 944 is a step 946 where the header is provided. As discussed elsewhere herein, the header may identify the slot as a spillover slot and may contain information about which of the metadata entries 866-868 contain data. Initially, the header may indicate that none of metadata entries 866-868 contain data. Following the step 946, processing is complete.

Figure 23:
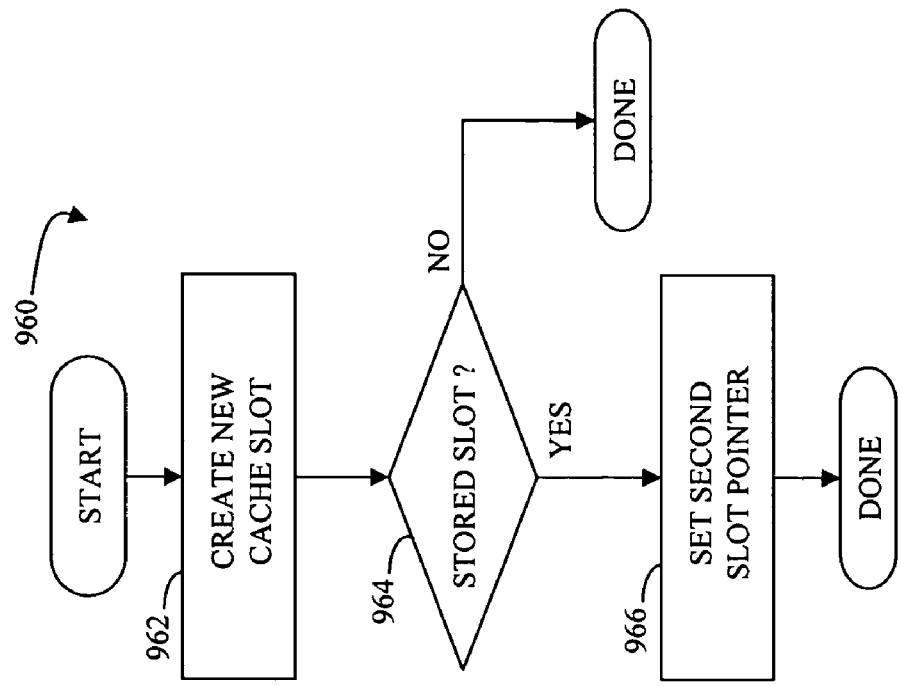
FIG. 23 is flow chart illustrating creating a new cache memory slot according to the system described herein.

Referring to FIG. 23, a flow chart 960 illustrates steps performed in connection with creation of a new cache slot in the cache memory. Different processing in connection with creation of a cache memory slot is useful in order to set the second slot pointer 922 in the metadata entry 900. Processing begins at a first step 962 where the new cache slot is created. Following the step 962 is a test step 964 where it is determined if there is a corresponding metadata entry for a cache memory slot for the same track as the slot created at the step 962. Determining and finding metadata entries is discussed in more detail elsewhere herein. If it is determined at the test step 964 that there is no corresponding metadata entry, then processing is complete. Otherwise, control transfers from the test step 964 to a step 966 where the second slot pointer for the metadata entry is set to point to the new slot created at the step 962. Following the step 966, processing is complete.

Figure 24:
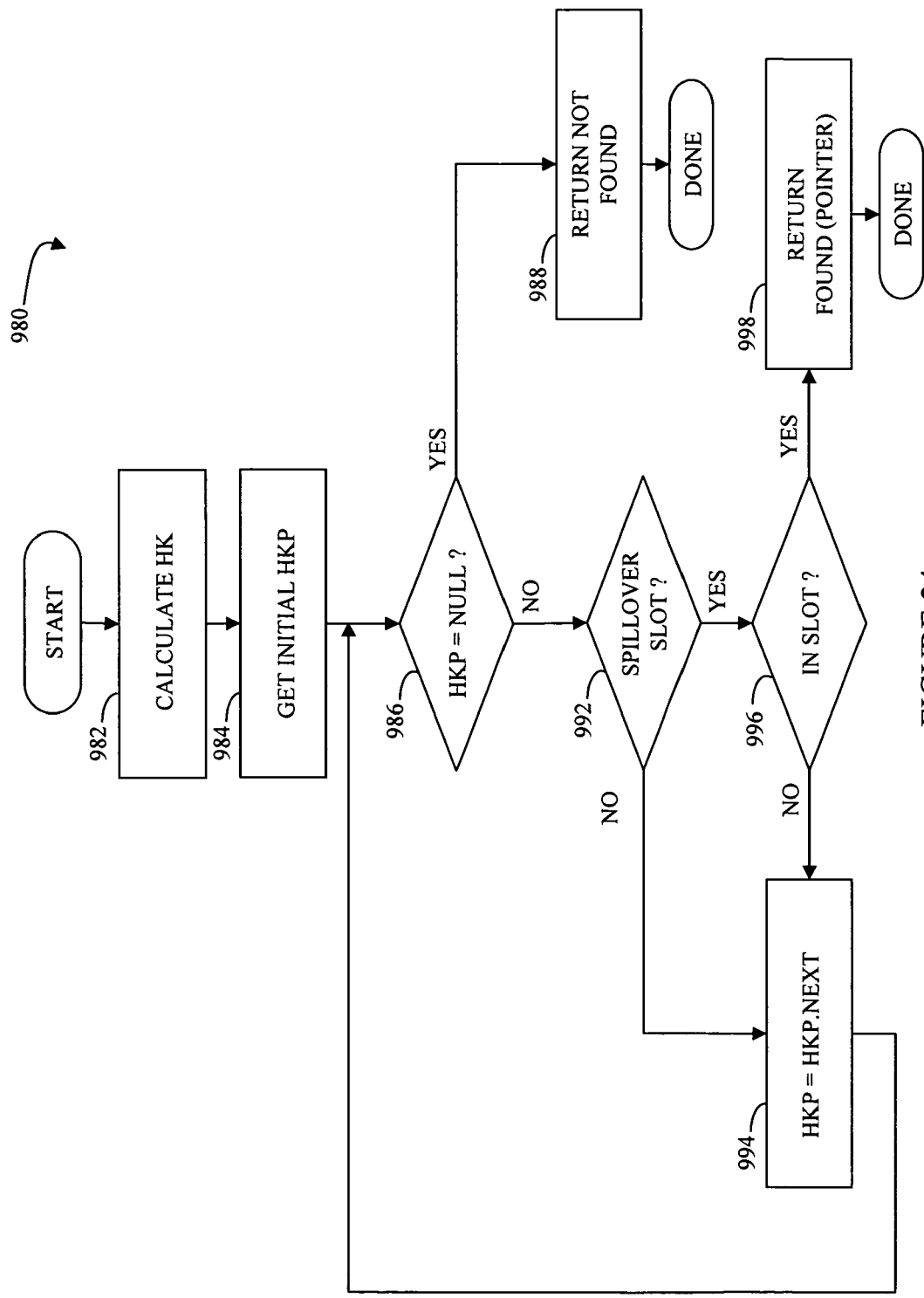
FIG. 24 is flow chart illustrating locating a spillover slot according to the system described herein.

Referring to FIG. 24, a flow chart 980 illustrates steps performed in connection with determining if there exists a spillover slot having a metadata entry for a particular track corresponding to a specific location on a storage device. The processing illustrated by the flow chart 980 may be used in connection with the test step 964, discussed above, and/or with other similar test steps discussed elsewhere herein.

Processing begins at a first step 982 where a hash key, HK, is calculated based on information relating to the source of the track, such as the logical device identifier, the cylinder and the head of the storage device for the track. As discussed elsewhere herein, any appropriate hashing algorithm may be used with any appropriate inputs to calculate the hash key. Generally, it is desirable to provide a set of inputs and hashing algorithm(s) that result in a relatively even the distribution of hash keys given the expected input values. As discussed elsewhere herein, the hash key may be used as an index to a table of pointers like the table 722, discussed above.

Following the step 982 is a step 984 where a pointer (HKP) to a slot based on the hash key is obtained (e.g., from the table 722). Following the step 984 is a test step 986 where it is determined if HKP points to null, indicating that the entire hash chain corresponding to HK has been traversed. If it is determined at the test step 986 that HKP points to null, then control passes from the test step 986 to a step 988 where a not found indicator is returned to signal a calling process that the track of interest is not stored on the local disk as part of a spillover slot. Following the step 988, processing is complete.

If it is determined at the test step 986 that HKP does not point to null, then control transfers from the step 986 to a test step 992 where it is determined if HKP points to a spillover slot. If not (and thus HKP does not point to a slot of interest), then control transfers from the step 992 to a step 994 to continue traversing the hash chain corresponding to HK. Following the step 994, control transfers back to the step 986 for a next iteration.

If it is determined at the test step 992 that HKP does point to a spillover slot, then control transfers from the step 992 to a step 996, where it is determined if the track of interest is found in the spillover slot pointed to by HKP. The processing performed at the step 996 is described in more detail elsewhere herein. If it is determined at the step 996 that the track of interest is not present in the spillover slot pointed to by HKP, then control transfers from the step 996 to the step 994, discussed above, to continue traversing the hash chain corresponding to HK. As described in more detail elsewhere herein, in the case of performing the test step 996, the test step 996 may return a value for HKP.next that is used at the step 996.

If it is determined at the test step 996 that the track of interest is present in the spillover slot pointed to by HKP, then control transfers from the step 996 to a step 998, where a pointer to the metadata entry in the spillover slot is returned to the calling process. Following the step 998, processing is complete. Use of the processing illustrated by the flow chart 980 and results thereof is described in more detail elsewhere herein.

Figure 25:
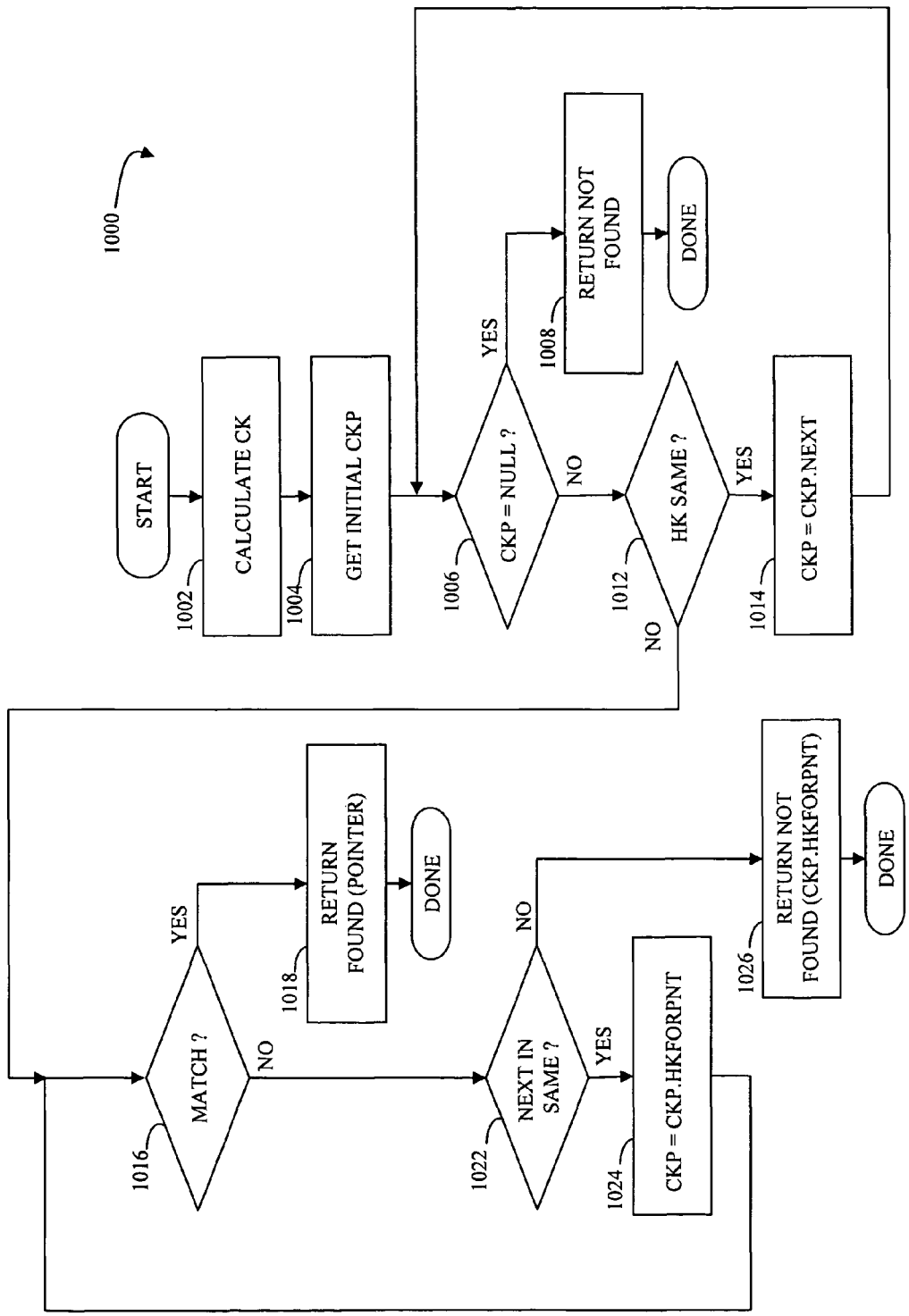
FIG. 25 is flow chart illustrating locating a metadata entry in a spillover slot according to the system described herein.

Referring to FIG. 25, a flow chart 1000 illustrates steps performed in connection with the test step 996, discussed above, to locate a metadata entry in a spillover slot. Processing begins at a first step 1002 where a secondary hash value, CK, is calculated. Just as with the hash key values discussed above, any appropriate hashing algorithm may be used with any appropriate inputs to calculate the secondary hash key. The secondary hash key CK is used as an index to the catalog entries 862-864 of the spillover slot 860, discussed above. In an embodiment herein, all slots that hash to the same value of HK hash to the same value of CK. However, it is also possible for different values of HK to hash to the same value of CK.

Following the step 1002 is a step 1004 where a pointer to a metadata entry, CKP, is determined. In an embodiment herein, CKP may be the one of the catalog entries 862-864 according to the index value, CK, determined at the step 1002. Following the step 1004 is a test step 1006 where it is determined if CKP points to null. If CKP points to null at the step 1006, then control transfers from the step 1006 to a step 1008 to return a not found indicator. Note that the spillover slot being processed is part of the hash chain corresponding to HK, and thus at least one of the metadata elements is expected to hash to a value corresponding to HK. Accordingly, the processing at the step 1008 could also return an error indicator. Following the step 1008, processing is complete.

If it is determined at the test step 1006 that CKP does not equal null, then control transfers from the test step 1006 to a test step 1012 where it is determined if a value calculated for HK for a slot pointed to by CKP equals the value of HK for the track of interest (calculated at the step 982, discussed above). If so, then control transfers from the step 1012 to a test step 1016 where it is determined if the metadata entry pointed to by CKP is for the track of interest. If so, then control transfers from the step 1016 to a step 1018, where a found indicator is returned along with possibly a pointer to the metadata entry. Following the step 1018, processing is complete.

If it is determined at the test step 1016 that the metadata entry pointed to by CKP is not for the track of interest, then control transfers from the step 1016 to a test step 1022 where it is determined if the hash key forward pointer field for the metadata entry pointed to by CKP points to another metadata entry within the current spillover slot pointed to by HKP (discussed above). As mentioned elsewhere herein, it is possible for more than one metadata entry from the same spillover slot to be linked together in a hash chain. When this occurs, the hash key forward pointer 912 may contain an index to a different metadata entry in the spillover slot rather than a pointer to a different slot in the cache memory. Accordingly, if it is determined at the test step 1022 that the hash key forward pointer 912 contains an index to a different metadata entry in the spillover slot, then control transfers from the test step 1022 to a step 1024, where CKP is set to point to the different metadata entry in the spillover slot. Following the step 1024, control transfers back to the step 1016, discussed above.

If it is determined at the test step 1022 that the hash key forward pointer 912 does not contain an index (pointer) to a different metadata entry in the current spillover slot, then control transfers from the test step 1022 to a step 1026, where a not found indicator is returned. In addition to the not found indicator, it is possible to return the hash key forward pointer of the metadata entry pointed to by CKP. Returning the hash key forward pointer allows the calling routine to continue traversing the hash chain (e.g., at the step 994, discussed above). Following the step 1026, processing is complete.

Figure 26:
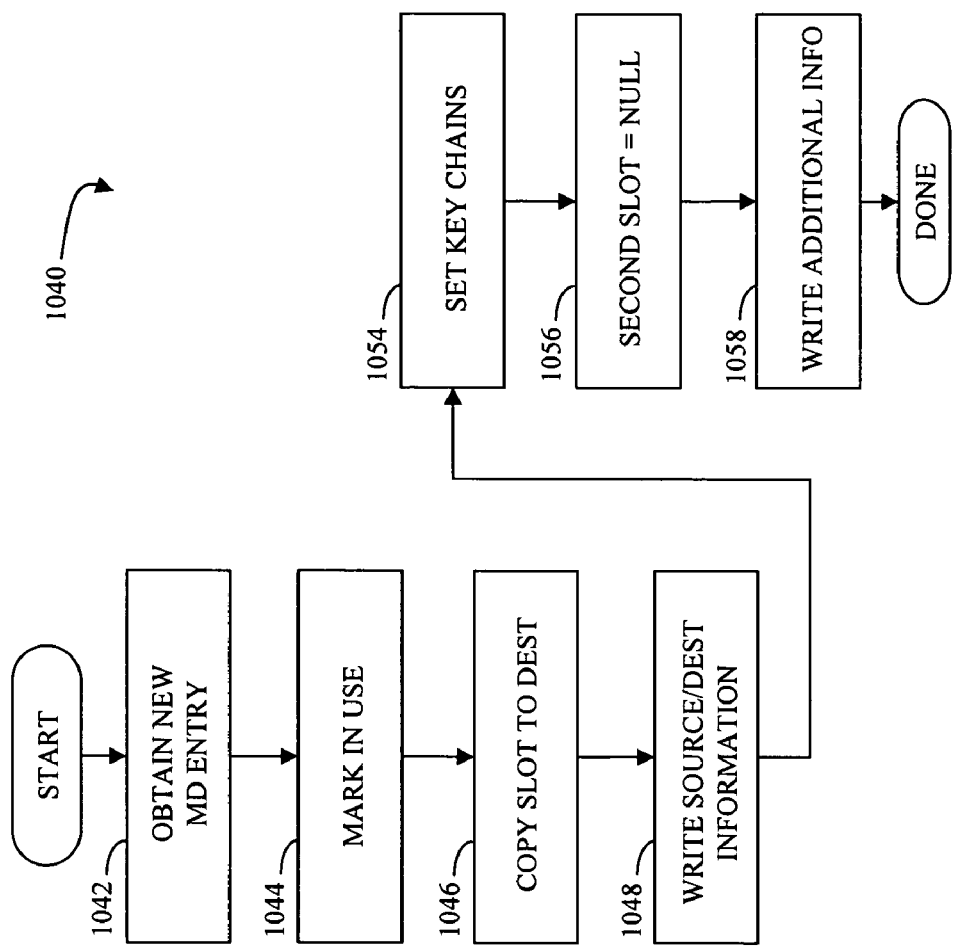
FIG. 26 is a flow chart illustrating creating a new metadata entry in a spillover slot according to the system described herein.

Referring to FIG. 26, a flow chart 1040 illustrates processing performed in connection with storing a tracks worth of data from the cache memory to a local disk and constructing a corresponding metadata entry in a spillover slot. The processing illustrated by the flow chart 1040 assumes that the spillover slot already exists (see the flow chart 960 of FIG. 23 and the corresponding description).

Processing begins at a first step 1042 where a free (unused) metadata entry is obtained. The processing at the step 1042 may examine the header field of the spillover slot to find a free (unused) metadata entry. Following the step 1042 is a step 1044 where the metadata entry obtained at the step 1042 is marked as being in use (e.g., a bit in a bitmap is set). Following the step 1044 is a step 1046 where the data is copied from the slot in the cache memory to a destination logical device corresponding to the local disk.

In an embodiment herein, a pool of logical devices is used to store data copied from slots in the cache memory. The pool of logical devices may be managed and maintained in any fashion using, for example, conventional techniques. In some embodiments, new logical devices may be created/established as more storage space is needed. In addition, the data that is written to the destination logical device may include information identifying the source (e.g., the device no., cylinder, and head of the track) so that it is possible to read the data from the destination logical device and correlate the data to the original source thereof. Use of this mechanism is described in more detail elsewhere herein.

Following the step 1046 is a step 1048 where source and destination information are written to the metadata entry. As discussed in more detail elsewhere herein, the metadata entry 900 contains fields for source information 902-904 and destination information 906-908. Following the step 1048 is a step 1054 where the hash key forward pointer field 912 and the hash key reverse pointer field 914, and possibly the catalog key (secondary hash key) forward pointer field 916 and the catalog key reverse pointer field 918, are all set. The processing performed at the step 1054 is discussed in more detail elsewhere herein. Following the step 1054 is a step 1056 where in the second slot field 922 of the metadata entry is set to null. Following the step 1056 is a step 1058 where additional track information, such as record flags, etc., is written to the additional info field 924 of the metadata entry 900. Following step 1058, processing is complete.

Figure 27:
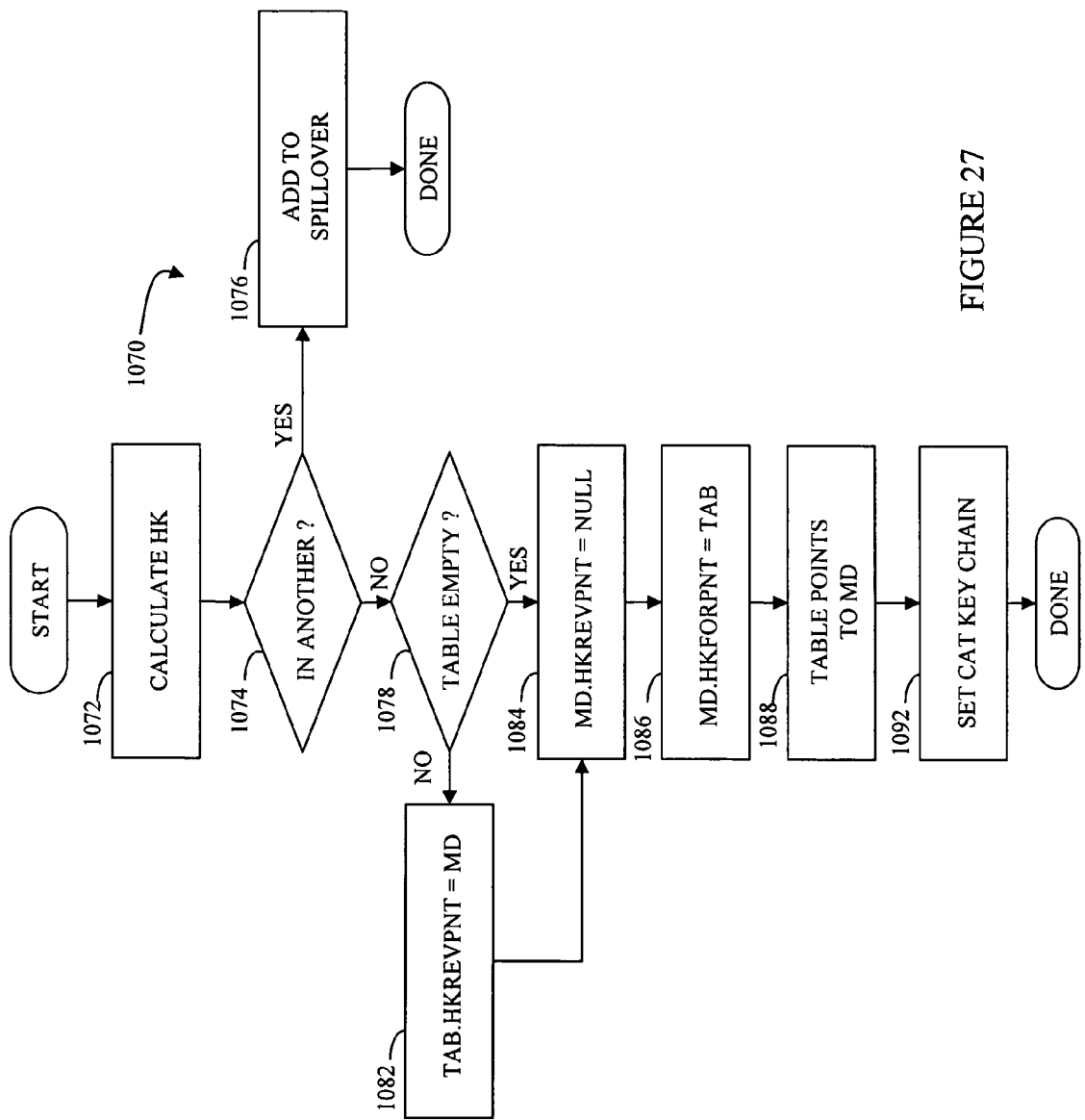
FIG. 27 is a flow chart illustrating setting hash chain pointers for a new metadata entry in a spillover slot according to the system described herein.

Referring to FIG. 27, a flow chart 1070 illustrates steps performed in connection with setting key chains at the step 1054, discussed above. Processing begins at a first step 1072 where the hash key, HK, is calculated. Following the step 1072 is a test step 1074 where it is determined if there is already another entry for HK in the spillover slot to which the metadata entry is being added. If so, then control transfers from the test step 1074 to a step 1076 where the new metadata entry is added to the spillover slot that already contains metadata entries corresponding to HK. The processing performed at the step 1076 is described in more detail elsewhere herein. Following the step 1076, processing is complete.

If it determined at the test step 1074 that the spillover slot to which the new metadata entry is being added does not already contain metadata entries for the same spillover slot, then control passes from the test step 1074 to a test step 1078 where it is determined if the entry for the table corresponding to HK (e.g., the table 722) is empty. If not, then control transfers from the test step 1078 to a step 1082 where the reverse HK chain pointer for the hash table entry (TAB) is set to point to the spillover slot for the new metadata entry. Following the step 1082 is a step 1084 where the reverse HK pointer for the new metadata entry is set to null. Following the step 1084 is a step 1086 where the forward HK pointer for the new metadata entry is made to point to the hash table entry (TAB). Following the step 1086 is a step 1088 where the table entry corresponding to HK (e.g., in the table 722) is made to point to the spillover slot containing the new metadata entry. Following the step 1088 is a step 1092 where the catalog key (secondary hash key) forward pointer field 916 and the catalog key reverse pointer field 918, are set. The processing performed at the step 1092 is discussed in more detail elsewhere herein. Following the step 1092, processing is complete.

Figure 28:
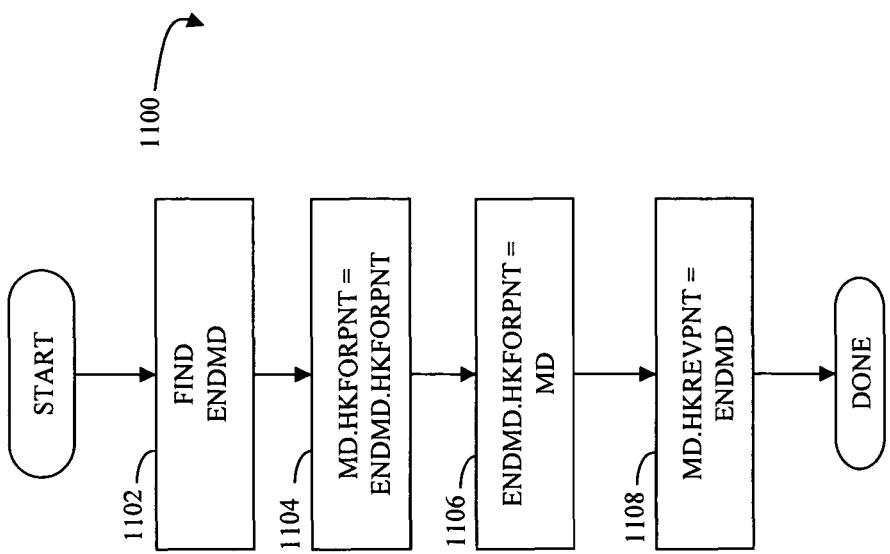
FIG. 28 is a flow chart illustrating adding a new metadata entry in a spillover slot to a hash chain according to the system described herein.

Referring to FIG. 28, a flow chart 1100 illustrates steps performed in connection with the step 1076 of the flow chart 1070 where a new metadata entry is added to a spillover slot that already contains metadata entries for the hash chain to which the new metadata entry belongs. Processing begins at a first step 1102 to find the end element (ENDMD) of the chain of metadata entries in the spillover slot corresponding to HK. Finding the end of the linked list of metadata entries at the step 1102 is fairly straightforward and involves traversing the index values at HFFORPNT until an entry is found for which HKFORPNT equals null or points to a different slot. Following the step 1102 is a step 1104 where forward pointer for the new metadata entry is set to be the same as the forward pointer for ENDMD. Following the step 1104 is a step 1106 where ENDMD.HKFORPNT is set to point to the new metadata entry, MD. Following the step 1106 is a step 1108 where the reverse pointer for new metadata entry is set to point to ENDMD. Following the step 1108, processing is complete.

Figure 29:
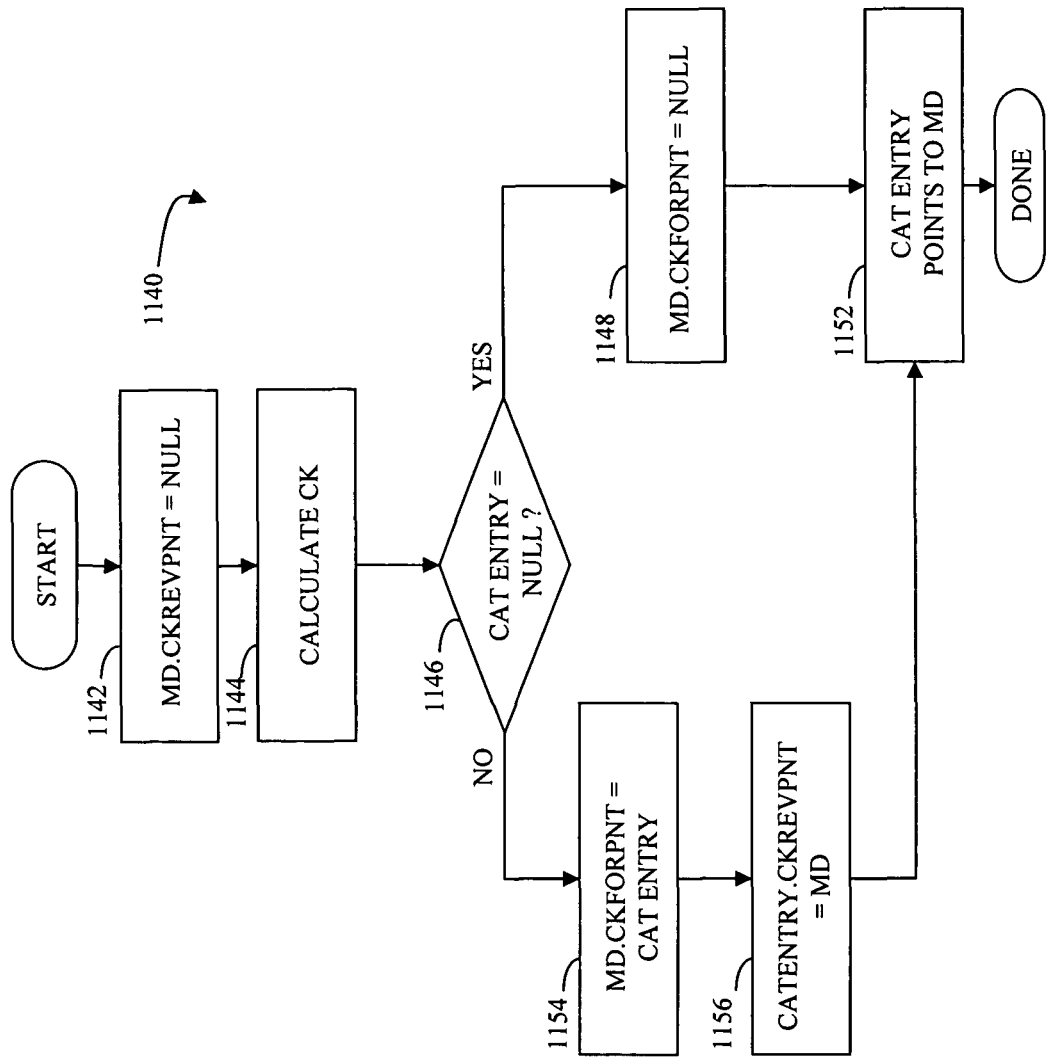
FIG. 29 is a flow chart illustrating setting catalog key pointers for a new metadata entry in a spillover slot according to the system described herein.

Referring to FIG. 29, a flow chart 1140 illustrates steps performed in connection with setting the catalog key forward pointer and the catalog key reverse pointer for the new metadata entry at the step 1092, discussed above. Processing begins at a first step 1142 where the catalog key reverse pointer is set to null. Following the first step 1142 is a step 1144 where the catalog key, CK, is calculated. Following the step 1144 is a test step 1146 where it is determined if the catalog entry (from the catalog entries 862-864 of the spillover slot 860) corresponding to CK is empty. If so, then control transfers from the test step 1146 to a step 1148 where the catalog key forward pointer for the new metadata entry is set to null. Following the step 1148 is a step 1152 where the catalog entry corresponding to CK is made to point to the new metadata entry. As discussed elsewhere herein, the catalog key forward pointer field and the catalog reverse pointer field may be provided in the form of index values that indicate where a particular metadata entry is located within a spillover slot. Following the step 1152, processing is complete.

If it is determined at the test step 1146 that the catalog entry corresponding to CK is not empty, then control transfers from the test step 1146 to a step 1154 where the catalog key forward pointer of the new metadata entry is made to point to the metadata entry indicated by the catalog entry. Following the step 1154 is a step 1156 where the catalog key reverse pointer field for the metadata entry corresponding to the catalog entry is set to point to the new metadata entry. Following the step 1156 is the step 1152, discussed above, where the catalog entry corresponding to CK is made to point to the new metadata entry. Following the step 1152, processing is complete.

Figure 30:
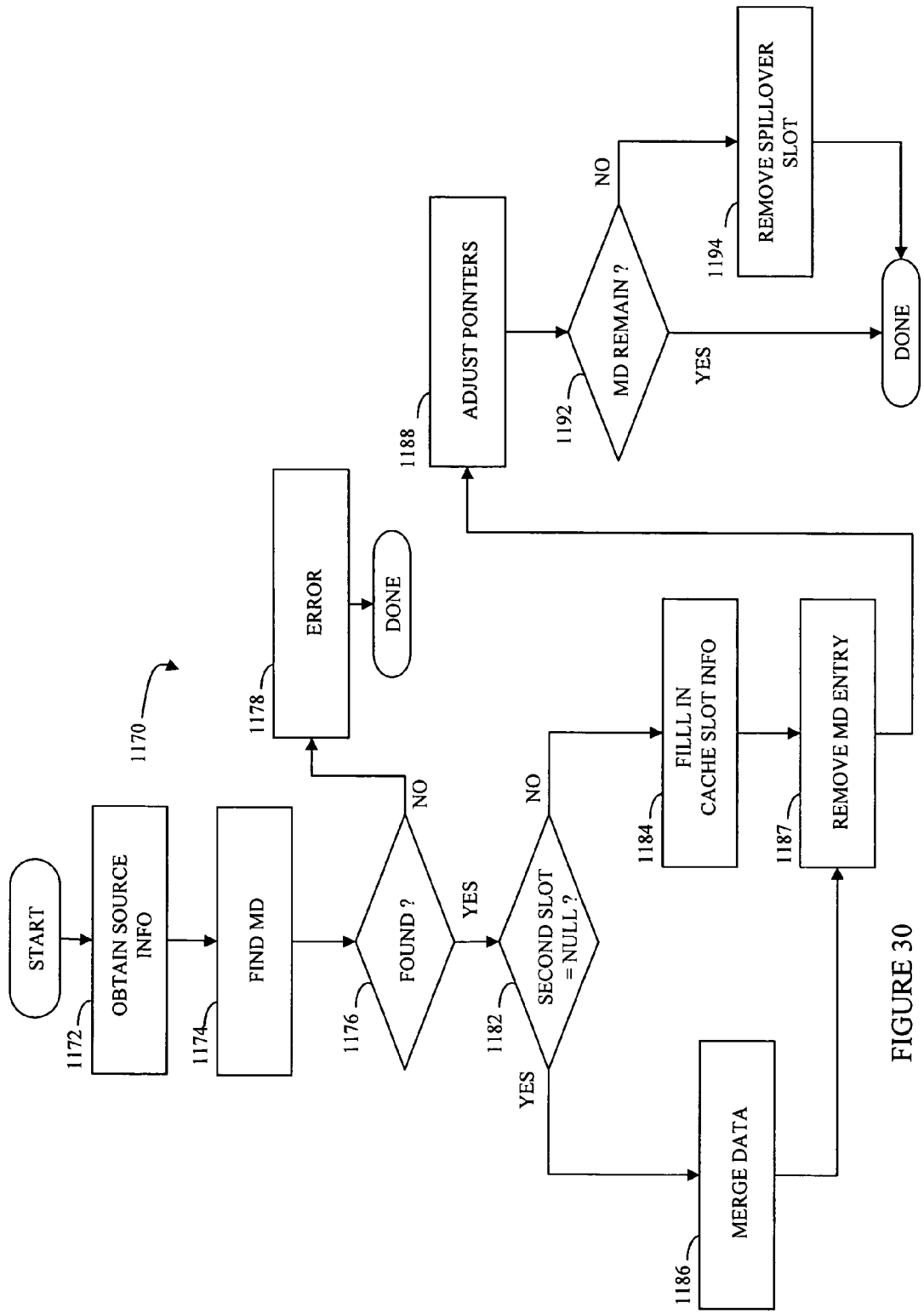
FIG. 30 is a flow chart illustrating restoring data from a local disk to a cache memory according to the system described herein.

Referring to FIG. 30, a flow chart 1170 illustrates steps performed in connection with restoring data from a local disk to cache memory. As discussed elsewhere herein, data is restored by initially reading into the cache memory a sequence of tracks from a logical device used to store data from the cache memory. As also discussed herein, the data on the logical devices may include information indicating the initial source of the data. Thus, for example, a sequence of contiguous tracks is read into the cache memory at the step 824 of the flow chart 820 of FIG. 19 and then the data in the cache memory is restored. Accordingly, the processing illustrated by the flow chart 1170 may correspond to the step 826 of the flow chart 820 of FIG. 19, discussed above.

Processing for the flow chart 1170 begins at a first step 1172 where source information is obtained for a track recently read into the cache memory from the local disk. As discussed elsewhere herein, the source information may be provided with the data on the local disk. Following the step 1172 is a step 1174 where a corresponding metadata entry (in a spillover slot) is found. The processing performed at the step 1174 corresponds to the flow charts 980, 1000 of FIGS. 24 and 25, respectively. Following the step 1174 is a test step 1176 where it is determined if a metadata entry is found. If not, then control passes from the test step 1176 to a step 1178 to signal an error. Note that it may be an error condition if there is a track on the logical device used to store data from the cache memory without there being a corresponding metadata entry in a spillover slot. Following the step 1178, processing is complete.

If it is determined at the test step 1176 that a metadata entry does exist, then control transfers from the test step 1176 to a test step 1182 where it is determined if the metadata entry found at the step 1174 has a second slot pointer 922 (discussed above) that points to a different slot already in the cache memory. If not, then control transfers from the test step 1182 to a step 1184 where the cache slot information is copied into data read into the cache memory from the local disk. The information copied at the step 1184 may include the source information, some or all of the additional info 924 (discussed above), etc. Performing the processing at the step 1184 is intended to restore the cache memory slot to a state of the slot just prior to being stored on the local disk.

If it is determined at the test step 1182 that there is a second slot field already in the cache memory, then control transfers from the test step 1182 to a step 1186 where the data read into the cache memory from the local disk is merged with the data already in cache. The existence of a second slot means that there is a newer version of the corresponding track already in the cache memory and thus the tracks may be merged on that basis. After the data is merged at the step 1186, only one slot will be maintained in the cache memory.

Following the steps 1184, 1186 is a step 1187 where the metadata entry is removed from the spillover slot by, for example, adjusting a portion of the header field that indicates if a particular metadata entry is in use. Following the step 1187 is a step 1188 where the pointers are adjusted in connection with removing the metadata entry. Adjusting the pointers at the step 1188 is described in more detail elsewhere herein.

Following the step 1188 is a test step 1192 where it is determined if there are any more remaining metadata entries after removing the metadata entry at the step 1187. If so, then processing is complete. Otherwise, control transfers from the test step 1192 to a step 1194 where the entire spillover cache memory slot is released to be returned for future use, possibly by unrelated processes. Following the step 1194, processing is complete.

Figure 31:
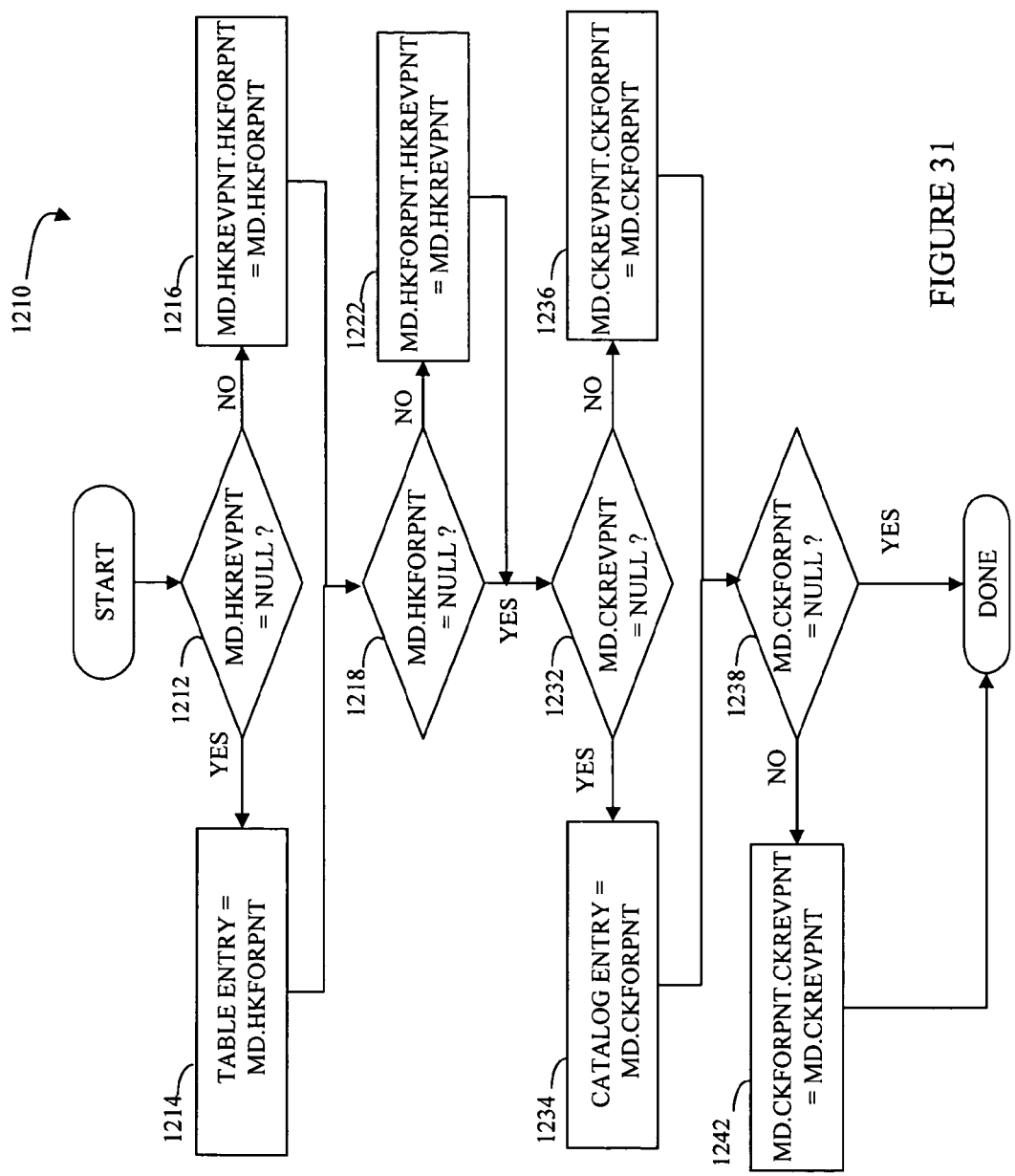
FIG. 31 is a flow chart illustrating adjusting pointers in connection with removing a metadata entry according to the system described herein.

Referring to FIG. 31, a flow chart 1210 illustrates in more detail processing performed in connection adjusting pointers in connection with the step 1188 of the flow chart 1170 of FIG. 30. Processing begins at a first test step 1212 where it is determined if the hash key reverse pointer for the metadata entry being removed, MD, is null. If so (indicating that the metadata entry is the first element of the hash chain for HK), then control transfers from the step 1212 to a step 1214 where the hash table entry (e.g., the table 722, discussed above) is made to point to the next element in the hash chain indicated by the hash key forward pointer of MD. If, on the other hand, it is determined that the hash key reverse pointer for MD is not null, then control transfers from the test step 1212 to a step 1216 where the hash key forward pointer for the previous element in the hash chain is set to the hash key forward pointer of MD.

Following the steps 1214, 1216 is a test step 1218 where it is determined if the hash key forward pointer of the metadata entry being removed, MD, is null (i.e., if MD is the last element in the hash chain corresponding to HK). If not, then control transfers from the test step 1218 to a step 1222 where the reverse hash key pointer for the previous element in the hash chain is set to the hash key reverse pointer of MD.

Following the step 1222 or following the step 1218 if MD is the last element of the hash chain corresponding to HK is a step 1232 where it is determined if the catalog key reverse pointer for the metadata entry being removed, MD, is null. If so (indicating that the metadata entry is pointed to directly by the entry in the catalog entries 862-864 index by CK in the spillover slot), then control transfers from the step 1232 to a step 1234 where the catalog entry for the spillover slot is made to point to the next element indicated by the catalog key forward pointer of MD. If, on the other hand, it is determined that the catalog key reverse pointer for MD is not null, then control transfers from the test step 1232 to a step 1236 where the catalog key forward pointer for the previous element in the linked list is set to the catalog key forward pointer of MD.

Following the steps 1234, 1236 is a test step 1238 where it is determined if the catalog key forward pointer of the metadata element being removed, MD, is null (i.e., if MD is the last element on the hash chain for the catalog key). If not, then control passes from the test step 1218 to a step 1222 where the catalog key reverse pointer for the previous element in the catalog key hash chain is set to the catalog key reverse pointer of MD.

Although the system described herein uses tracks as a unit of data for certain purposes, it should be understood that other units of data (including, possibly, variable length units of data) may be used. This also applies to other data structures and data units. In addition, in some instances, the order of steps in the flow charts may be modified, where appropriate. The system may store any appropriate data from the cache memory to a local disk, including data that is not part of any chunks as described herein. The system described herein may be implemented using software provided in a computer-readable storage medium. The computer-readable storage medium may be located on at least one of the directors 42a-42c.

While the invention has been disclosed in connection with various embodiments, modifications thereon will be readily apparent to those skilled in the art. Accordingly, the spirit and scope of the invention is set forth in the following claims.

What is claimed is:

1. A method of managing data transferred from a local storage device to a remote storage device, comprising:
    maintaining the data in chunks in cache memory, wherein data writes to the local storage device begun during a particular time interval are associated with a chunk of data that is separate from other chunks of data and wherein data is transferred from the local storage device to the remote storage device by transferring a particular chunk after all data writes associated with the particular chunk have completed at the local storage device and after a previous chunk has been acknowledged as being received by the remote storage device; and
    in response to an amount of data in the cache memory exceeding a first threshold, storing data from a first chunk of the cache memory to a logical device of the local storage device that is specifically allocated to receive data stored from the cache memory, wherein data from the first chunk is not stored to the logical device when the amount of the data in the cache memory is less than the first threshold.

2. A method, according to claim 1, wherein data writes to the local storage device are provided by a host coupled to the local storage device.

3. A method, according to claim 1, further comprising:
    following storing the data from the first chunk of the cache memory to the logical device, storing data from a second chunk of the cache memory to the logical device in response to use of the cache memory exceeding a second threshold, wherein the second chunk is transmitted from the local storage device to the remote storage device while the first chunk is being accumulated at the local storage device.

4. A method, according to claim 3, wherein the second chunk is transmitted from the local storage device to the remote storage device while the first chunk is being stored on the logical device.

5. A method, according to claim 3, wherein, in response to the local storage device not being able to transmit data to the remote storage device, the first chunk of data is selected from a chunk of data ready to be transmitted from the local storage device to the remote storage device.

6. A method, according to claim 1, wherein storing data from the first chunk of the cache memory to the logical device includes providing information in a portion of the cache memory to facilitate restoring the data from the logical device to the cache memory.

7. A method, according to claim 1, further comprising:
    in response to the cache memory having enough free space for all the chunks previously provided to the logical device, data is restored from the logical device to the cache memory.

8. A method, according to claim 7, wherein determining if the cache memory has enough free space for all the chunks includes summing an amount of chunk data in the cache memory with an amount of chunk data stored on the logical device and comparing a result thereof to the first threshold.

9. Computer software, provided in a computer readable storage medium, that manages data transferred from a local storage device to a remote storage device, the software comprising:
    executable code that maintains the data in chunks in cache memory, wherein data writes to the local storage device begun during a particular time interval are associated with a chunk of data that is separate from other chunks of data and wherein data is transferred from the local storage device to the remote storage device by transferring a particular chunk after all data writes associated with the particular chunk have completed at the local storage device and after a previous chunk has been acknowledged as being received by the remote storage device;
    executable code that stores data from a first chunk of the cache memory to a logical device of the local storage device that is specifically allocated to receive data stored from the cache memory in response to an amount of data in the cache memory exceeding a first threshold, wherein data from the first chunk is not stored to the logical device when the amount of the data in the cache memory is less than the first threshold.

10. Computer software, according to claim 9, further comprising:
    executable code that, following storing the data from the first chunk of the cache memory to the logical device, stores data from a second chunk of the cache memory to the logical device in response to use of the cache memory exceeding a second threshold, wherein the second chunk is transmitted from the local storage device to the remote storage device while the first chunk is being accumulated at the local storage device.

11. Computer software, according to claim 10, wherein the second chunk is transmitted from the local storage device to the remote storage device while the first chunk is being stored on the logical device.

12. Computer software, according to claim 10, wherein, in response to the local storage device not being able to transmit data to the remote storage device, executable code causes the first chunk of data to be selected from a chunk of data ready to be transmitted from the local storage device to the remote storage device.

13. Computer software, according to claim 9, further comprising:
    executable code that provides information in a portion of the cache memory to facilitate restoring the data from the logical device to the cache memory after storing data from the first chunk of the cache memory to the logical device.

14. Computer software, according to claim 9, further comprising:
    executable code that restores data from the logical device to the cache memory in response to the cache memory having enough free space for all the chunks previously provided to the logical device.

15. Computer software, according to claim 14, wherein determining if the cache memory has enough free space for all the chunks includes summing an amount of chunk data in the cache memory with an amount of chunk data stored on the logical device and comparing a result thereof to the first threshold.

16. A data storage device, comprising:
    at least one disk drive that contains data;
    at least one host adaptor, coupled to the at least one disk drive, that receives data to be stored on the at least one disk drive;
    at least one cache memory that contains data writes to the data storage device begun during a particular time interval that are associated with a chunk of data that is separate from other chunks of data, wherein data is transferred by transferring a particular chunk after all data writes associated with the particular chunk have completed at the local storage device and after a previous chunk has been acknowledged as being received; and
    computer software, in a computer-readable medium, having executable code that stores data from a first chunk of the cache memory to a logical device of the data storage device that is specifically allocated to receive data stored from the cache memory in response to an amount of data in the cache memory exceeding a first threshold, wherein data from the first chunk is not stored to the logical device when the amount of the data in the cache memory is less than the first threshold.

17. A data storage device, according to claim 16, wherein the computer software also includes executable code that, following storing the data from the first chunk of the cache memory to the logical device, stores data from a second chunk of the cache memory to the logical device in response to use of the cache memory exceeding a second threshold, wherein the second chunk is transmitted from the local storage device to the remote storage device while the first chunk is being accumulated at the local storage device.

18. A data storage device, according to claim 16, wherein the computer software also includes executable code that provides information in a portion of the cache memory to facilitate restoring the data from the logical device to the cache memory after storing data from the first chunk of the cache memory to the logical device.

19. A data storage device, according to claim 16, wherein the computer software also includes executable code that restores data from the logical device to the cache memory in response to the cache memory having enough free space for all the chunks previously provided to the logical device.

20. A data storage device, according to claim 19, wherein determining if the cache memory has enough free space for all the chunks includes summing an amount of chunk data in the cache memory with an amount of chunk data stored on the logical device and comparing a result thereof to the first threshold.

* * * * *